US 6,709,360 B2

(12) United States Patent
Raghavan et al.

(10) Patent No.: US 6,709,360 B2
(45) Date of Patent: Mar. 23, 2004

(54) FAMILY OF MULTI-SPEED TRANSMISSION MECHANISMS WITH THREE INPUT CLUTCHES AND THREE PLANETARY GEARSETS

(75) Inventors: Madhusudan Raghavan, West Bloomfield, MI (US); Norman Kenneth Bucknor, Troy, MI (US); Patrick Benedict Usoro, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/211,615

(22) Filed: Aug. 2, 2002

(65) Prior Publication Data

US 2004/0023745 A1 Feb. 5, 2004

(51) Int. Cl.$^7$ .............................. F16H 3/44; F16H 37/06
(52) U.S. Cl. ........................ 475/280; 475/282; 475/330
(58) Field of Search ................................ 475/275, 278, 475/280, 282, 284, 311

(56) References Cited

U.S. PATENT DOCUMENTS

| 3,946,624 A | * | 3/1976 | Murakami et al. ...... 475/280 X |
| 3,952,613 A | * | 4/1976 | Iijima ......................... 475/280 |
| 4,070,927 A | | 1/1978 | Polak .......................... 74/765 |
| 4,709,594 A | | 12/1987 | Maeda ......................... 74/753 |
| 5,106,352 A | | 4/1992 | Lepelletier .................. 475/280 |
| 5,599,251 A | | 2/1997 | Beim et al. .................. 475/275 |
| 6,053,839 A | | 4/2000 | Baldwin et al. ............. 475/281 |
| 6,071,208 A | | 6/2000 | Koivunen .................... 475/275 |
| 6,083,135 A | | 7/2000 | Baldwin et al. ............. 475/276 |
| 6,217,474 B1 | | 4/2001 | Ross et al. ................... 475/269 |
| 2003/0054917 A1 | * | 3/2003 | Raghavan et al. .......... 475/330 |

FOREIGN PATENT DOCUMENTS

| DE | 10162883 | * | 7/2003 | |
| EP | 1033510 | | 9/2000 | |
| JP | 05026310 | * | 2/1993 | ................. 475/280 |
| JP | 9-126283 | | 5/1997 | |

* cited by examiner

Primary Examiner—Roger Pang
(74) Attorney, Agent, or Firm—Kathryn A. Marra

(57) ABSTRACT

A family of transmission mechanisms having at least six forward speeds wherein each family member includes three planetary gearsets, five torque transmitting mechanisms, and three interconnecting members. The planetary gear sets each have three members (sun gear member, ring gear member, and planet carrier assembly member). The interconnecting members provide continuous interconnection between the members of the planetary gearsets. An output shaft is continuously interconnected with at least one member of one of the planetary gearsets. An input shaft is selectively interconnectable with members of the planetary gearsets through three of the torque transmitting mechanisms (clutches). The two other torque transmitting mechanisms (clutches or brakes) selectively interconnect members of the planetary gear sets or selectively interconnect a housing with at least one member of the planetary gearsets. The torque transmitting mechanisms are selectively engageable in combinations of two to establish at least six forward speed ratios and one reverse speed ratio between the input shaft and the output shaft.

8 Claims, 14 Drawing Sheets

FIG. 1

|  | RATIOS | 56 | 58 | 50 | 52 | 54 |
|---|---|---|---|---|---|---|
| REVERSE | -2.70 | X |  |  |  | X |
| NEUTRAL | 0 | X |  |  |  |  |
| 1 | 4.74 | X |  | X |  |  |
| 2 | 3.06 |  | X | X |  |  |
| 3 | 1.88 |  |  | X |  | X |
| 4 | 1.44 |  |  | X | X |  |
| 5 | 1.00 |  |  |  | X | X |
| 6 | 0.73 |  | X |  | X |  |

(X=engaged)

Ring Gear/Sun Gear Tooth Ratios: $\frac{R1}{S1}=2.30, \frac{R2}{S2}=2.30, \frac{R3}{S3}=2.70$

| Ratio Spread | 6.49 |
|---|---|
| Ratio Steps |  |
| REV/1 | -0.57 |
| 1/2 | 1.55 |
| 2/3 | 1.62 |
| 3/4 | 1.31 |
| 4/5 | 1.44 |
| 5/6 | 1.37 |

| | RATIOS | 156 | 158 | 150 | 152 | 154 |
|---|---|---|---|---|---|---|
| REVERSE | -2.25 | X | | | | X |
| NEUTRAL | 0 | X | | | | |
| 1 | 3.96 | X | | X | | |
| 2 | 2.29 | | X | X | | |
| 3 | 1.32 | | | X | | X |
| 4 | 1.00 | | | X | X | |
| 5 | 0.75 | | | | X | X |
| 6 | 0.56 | | X | | X | |

(X=engaged)

Ring Gear/Sun Gear Tooth Ratios: $\frac{R1}{S1} = 2.98, \frac{R2}{S2} = 2.95, \frac{R3}{S3} = 3.0$

| Ratio Spread | 7.04 |
|---|---|
| Ratio Steps | |
| REV/1 | -0.57 |
| 1/2 | 1.72 |
| 2/3 | 1.74 |
| 3/4 | 1.32 |
| 4/5 | 1.33 |
| 5/6 | 1.33 |

| | RATIOS | 258 | 250 | 252 | 254 | 256 |
|---|---|---|---|---|---|---|
| REVERSE | -2.04 | | | | X | X |
| NEUTRAL | 0 | X | | | | |
| 1 | 4.00 | X | | X | | |
| 2 | 2.20 | | | X | | X |
| 3 | 1.43 | | | X | X | |
| 4 | 1.00 | | X | X | | |
| 5 | 0.81 | | X | | X | |
| 6 | 0.60 | | X | | | X |

(X=engaged)

Ring Gear/Sun Gear Tooth Ratios: $\frac{R1}{S1} = 1.50, \frac{R2}{S2} = 3.0, \frac{R3}{S3} = 2.53$

| Ratio Spread | 6.67 |
|---|---|
| Ratio Steps | |
| REV/1 | -0.51 |
| 1/2 | 1.82 |
| 2/3 | 1.54 |
| 3/4 | 1.43 |
| 4/5 | 1.23 |
| 5/6 | 1.35 |

| | RATIOS | 350 | 352 | 354 | 356 | 358 |
|---|---|---|---|---|---|---|
| REVERSE | -2.16 | | | X | | X |
| NEUTRAL | 0 | | | | X | |
| 1 | 4.00 | | X | | X | |
| 2 | 2.20 | | X | | | X |
| 3 | 1.43 | | X | X | | |
| 4 | 1.00 | X | X | | | |
| 5 | 0.81 | X | | X | | |
| 6 | 0.60 | X | | | | X |

(X=engaged)

Ring Gear/Sun Gear Tooth Ratios: $\frac{R1}{S1} = 1.50, \frac{R2}{S2} = 3.0, \frac{R3}{S3} = 2.63$

| Ratio Spread | 6.67 |
|---|---|
| Ratio Steps | |
| REV/1 | -0.54 |
| 1/2 | 1.82 |
| 2/3 | 1.54 |
| 3/4 | 1.43 |
| 4/5 | 1.23 |
| 5/6 | 1.36 |

| | RATIOS | 456 | 458 | 450 | 452 | 454 |
|---|---|---|---|---|---|---|
| REVERSE | -3.02 | X | | | | X |
| NEUTRAL | 0 | X | | | | |
| 1 | 5.54 | X | | | X | |
| 2 | 3.27 | | X | | X | |
| 3 | 1.86 | | | | X | X |
| 4 | 1.38 | | | X | X | |
| 5 | 1.00 | | | X | | X |
| 6 | 0.75 | | X | X | | |

(X=engaged)

Ring Gear/Sun Gear Tooth Ratios: $\frac{R1}{S1} = 1.87$, $\frac{R2}{S2} = 1.83$, $\frac{R3}{S3} = 3.02$

| Ratio Spread | 7.37 |
|---|---|
| Ratio Steps | |
| REV/1 | -0.54 |
| 1/2 | 1.70 |
| 2/3 | 1.75 |
| 3/4 | 1.35 |
| 4/5 | 1.38 |
| 5/6 | 1.33 |

|  | RATIOS | 556 | 558 | 550 | 552 | 554 |
|---|---|---|---|---|---|---|
| REVERSE | -2.42 |  | X | X |  |  |
| NEUTRAL | 0 |  | X |  |  |  |
| 1 | 2.49 |  | X |  | X |  |
| 2 | 1.43 | X |  |  | X |  |
| 3 | 1.00 |  |  | X | X |  |
| 4 | 0.75 |  |  |  | X | X |
| 5 | 0.56 |  |  | X |  | X |
| 6 | 0.45 | X |  |  |  | X |

(X=engaged)

Ring Gear/Sun Gear Tooth Ratios: $\frac{R1}{S1} = 2.98, \frac{R2}{S2} = 2.30, \frac{R3}{S3} = 2.32$

| Ratio Spread | 5.48 |
|---|---|
| Ratio Steps |  |
| REV/1 | -0.97 |
| 1/2 | 1.73 |
| 2/3 | 1.43 |
| 3/4 | 1.34 |
| 4/5 | 1.34 |
| 5/6 | 1.23 |

| | RATIOS | 656 | 658 | 650 | 652 | 654 |
|---|---|---|---|---|---|---|
| REVERSE | -3.30 | | X | X | | |
| NEUTRAL | 0 | | X | | | |
| 1 | 4.02 | | X | | X | |
| 2 | 2.22 | X | | | X | |
| 3 | 1.44 | | | X | X | |
| 4 | 1.00 | | | | X | X |
| 5 | 0.73 | | | X | | X |
| 6 | 0.60 | X | | | | X |

(X=engaged)

Ring Gear/Sun Gear Tooth Ratios: $\frac{R1}{S1} = 2.30, \frac{R2}{S2} = 1.83, \frac{R3}{S3} = 3.02$

| Ratio Spread | 6.74 |
|---|---|
| Ratio Steps | |
| REV/1 | -0.82 |
| 1/2 | 1.81 |
| 2/3 | 1.54 |
| 3/4 | 1.44 |
| 4/5 | 1.37 |
| 5/6 | 1.22 |

| | RATIOS | 758 | 750 | 752 | 754 | 756 |
|---|---|---|---|---|---|---|
| REVERSE | -3.02 | | | | X | X |
| NEUTRAL | 0 | | | | | X |
| 1 | 5.54 | | | X | | X |
| 2 | 3.48 | X | | X | | |
| 3 | 2.07 | | | X | X | |
| 4 | 1.48 | | X | X | | |
| 5 | 1.00 | | X | | X | |
| 6 | 0.75 | X | X | | | |

(X=engaged)

Ring Gear/Sun Gear Tooth Ratios: $\frac{R1}{S1} = 1.57, \frac{R2}{S2} = 1.83, \frac{R3}{S3} = 3.02$

| Ratio Spread | 7.37 |
|---|---|
| Ratio Steps | |
| REV/1 | -0.54 |
| 1/2 | 1.59 |
| 2/3 | 1.68 |
| 3/4 | 1.40 |
| 4/5 | 1.48 |
| 5/6 | 1.33 |

| | RATIOS | 856 | 858 | 850 | 852 | 854 |
|---|---|---|---|---|---|---|
| REVERSE | -1.87 | | X | X | | |
| NEUTRAL | 0 | | X | | | |
| 1 | 2.25 | | X | | X | |
| 2 | 1.43 | | | | X | |
| 3 | 1.00 | X | | X | X | |
| 4 | 0.75 | | | | X | X |
| 5 | 0.52 | | | X | | X |
| 6 | 0.41 | X | | | | X |

(X=engaged)

Ring Gear/Sun Gear Tooth Ratios: $\frac{R1}{S1} = 2.98, \frac{R2}{S2} = 2.30, \frac{R3}{S3} = 3.00$

| Ratio Spread | 5.49 |
|---|---|
| Ratio Steps | |
| REV/1 | -0.97 |
| 1/2 | 1.57 |
| 2/3 | 1.43 |
| 3/4 | 1.33 |
| 4/5 | 1.44 |
| 5/6 | 1.27 |

| | RATIOS | 956 | 958 | 950 | 952 | 954 |
|---|---|---|---|---|---|---|
| REVERSE | -3.30 | | X | X | | |
| NEUTRAL | 0 | | X | | | |
| 1 | 4.02 | | X | | X | |
| 2 | 2.22 | X | | | X | |
| 3 | 1.44 | | | X | X | |
| 4 | 1.00 | | | | X | X |
| 5 | 0.73 | | | X | | X |
| 6 | 0.60 | X | | | | X |

( X=engaged )

Ring Gear/Sun Gear Tooth Ratios: $\frac{R1}{S1} = 2.30, \frac{R2}{S2} = 2.83, \frac{R3}{S3} = 3.02$

| Ratio Spread | 6.74 |
|---|---|
| Ratio Steps | |
| REV/1 | -0.82 |
| 1/2 | 1.81 |
| 2/3 | 1.54 |
| 3/4 | 1.44 |
| 4/5 | 1.37 |
| 5/6 | 1.22 |

|  | RATIOS | 1056 | 1058 | 1050 | 1052 | 1054 |
|---|---|---|---|---|---|---|
| REVERSE | -3.11 |  |  | X | X |  |
| NEUTRAL | 0 |  |  | X |  |  |
| 1 | 4.02 |  |  | X | X |  |
| 2 | 2.32 | X |  |  | X |  |
| 3 | 1.50 |  |  | X | X |  |
| 4 | 1.00 |  |  |  | X | X |
| 5 | 0.69 |  |  | X |  | X |
| 6 | 0.56 | X |  |  |  | X |

(X=engaged)

Ring Gear/Sun Gear Tooth Ratios: $\frac{R1}{S1} = 3.00, \frac{R2}{S2} = 1.83, \frac{R3}{S3} = 3.02$

| Ratio Spread | 7.18 |
|---|---|
| Ratio Steps |  |
| REV/1 | -0.77 |
| 1/2 | 1.73 |
| 2/3 | 1.55 |
| 3/4 | 1.50 |
| 4/5 | 1.45 |
| 5/6 | 1.23 |

| | RATIOS | 1150 | 1152 | 1154 | 1156 | 1158 |
|---|---|---|---|---|---|---|
| REVERSE | -2.99 | | | X | | X |
| NEUTRAL | 0 | | | | | X |
| 1 | 3.94 | | X | | | X |
| 2 | 2.01 | | X | | X | |
| 3 | 1.54 | | X | X | | |
| 4 | 1.27 | X | X | | | |
| 5 | 1.00 | X | | | X | |
| 6 | 0.91 | X | | | X | |
| 7 | 0.66 | | | X | X | |

(X=engaged)

Ring Gear/Sun Gear Tooth Ratios: $\frac{R1}{S1} = 2.53, \frac{R2}{S2} = 2.94, \frac{R3}{S3} = 2.99$

| Ratio Spread | 6.02 |
|---|---|
| Ratio Steps | |
| REV/1 | -0.76 |
| 1/2 | 1.96 |
| 2/3 | 1.30 |
| 3/4 | 1.22 |
| 4/5 | 1.27 |
| 5/6 | 1.09 |
| 6/7 | 1.39 |

| | RATIOS | 1250 | 1252 | 1254 | 1256 | 1258 |
|---|---|---|---|---|---|---|
| REVERSE | -2.99 | | | X | | X |
| NEUTRAL | 0 | | | | | X |
| 1 | 3.94 | | X | | | X |
| 2 | 2.01 | | X | | X | |
| 3 | 1.54 | | X | X | | |
| 4 | 1.27 | X | X | | | |
| 5 | 1.00 | X | | | X | |
| 6 | 0.91 | X | | | | X |
| 7 | 0.66 | | | | X | X |

(X=engaged)

Ring Gear/Sun Gear Tooth Ratios: $\frac{R1}{S1} = 2.53, \frac{R2}{S2} = 2.94, \frac{R3}{S3} = 2.70$

| Ratio Spread | 6.02 |
|---|---|
| Ratio Steps | |
| REV/1 | -0.76 |
| 1/2 | 1.96 |
| 2/3 | 1.30 |
| 3/4 | 1.22 |
| 4/5 | 1.27 |
| 5/6 | 1.09 |
| 6/7 | 1.39 |

| | RATIOS | 1350 | 1352 | 1354 | 1356 | 1358 |
|---|---|---|---|---|---|---|
| REVERSE | -1.93 | | | X | | X |
| NEUTRAL | 0 | | | | | X |
| 1 | 3.47 | | X | | | X |
| 2 | 1.90 | | X | | X | |
| 3 | 1.35 | | X | X | | |
| 4 | 1.00 | X | X | | | |
| 5 | 0.68 | X | | X | | |
| 6 | 0.64 | X | | | X | |
| 7 | 0.50 | | | X | X | |

(X=engaged)

Ring Gear/Sun Gear Tooth Ratios: $\frac{R1}{S1} = 2.47, \frac{R2}{S2} = 1.80, \frac{R3}{S3} = 1.74$

| Ratio Spread | 6.95 |
|---|---|
| Ratio Steps | |
| REV/1 | -0.56 |
| 1/2 | 1.82 |
| 2/3 | 1.41 |
| 3/4 | 1.35 |
| 4/5 | 1.46 |
| 5/6 | 1.08 |
| 6/7 | 1.27 | ously interconnected

FAMILY OF MULTI-SPEED TRANSMISSION MECHANISMS WITH THREE INPUT CLUTCHES AND THREE PLANETARY GEARSETS

TECHNICAL FIELD

This invention relates to power transmissions and, more particularly, to a family of power transmissions providing at least six forward speed ratios utilizing three planetary gearsets, three input torque-transmitting mechanisms, and two other torque-transmitting mechanisms.

BACKGROUND OF THE INVENTION

Passenger vehicles include a powertrain that is comprised of an engine, multi-speed transmission, and a differential or final drive mechanism. The multi-speed transmission increases the overall operating range of the vehicle by permitting the engine to operate through its torque range a number of times as the transmission ratios are interchanged. The number of forward speed ratios that are available in a transmission determines the number of ratio interchanges that can occur and therefore the number of times the engine torque range can be repeated.

Early automatic transmissions had two speed ranges. This severely limited the overall speed range of the vehicle and therefore required a relatively large engine that could produce a wide speed and torque range. This resulted in the engine operating at a specific fuel consumption point, during cruising, other than the most efficient point. Therefore, manually shifted (countershaft transmissions) were the most popular.

With the advent of three and four speed automatic transmissions, the automatic shifting (planetary gear) transmission increased in popularity with the motoring public. These transmissions improve the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to five and even six speeds. This has been accomplished in many heavy truck powertrains. Six speed transmissions are disclosed in U.S. Pat. No. 4,070,927 issued to Polak on Jan. 31, 1978; U.S. Pat. No. 6,071,208 issued to Koivunen on Jun. 6, 2000; U.S. Pat. No. 5,106,352 issued to Lepelletier on Apr. 21, 1992; U.S. Pat. No. 5,599,251 issued to Beim and McCarrick on Feb. 4, 1997, U.S. Pat. No. 6,083,135 issued to Baldwin et al. on Jul. 4, 2000, and European Patent Application No. EP 1 033 510 A1 published Jun. 09, 2000.

Six speed transmissions offer several advantages over four and five speed transmissions, including improved vehicle acceleration and improved fuel economy. While many trucks employ six-speed transmissions, such as Polak, passenger cars are still manufactured, for the main part, with three and four speed automatic transmissions, and relatively few five or six speed devices due to the size and complexity of these transmissions. The Polak transmission provides six forward speed ratios with three planetary gearsets, two clutches, and three brakes. The Koivunen and Beim patents utilize six torque transmitting devices including four brakes and two clutches to establish the six forward speed ratios and one reverse ratio. The Lepelletier and the EP publications each employ three planetary gearsets, three clutches and two brakes to provide six forward speed ratios and one reverse ratio. One of the planetary gearsets in each of these publications is positioned and operated to establish two fixed speed input members for the remaining two planetary gearsets.

SUMMARY OF THE INVENTION

It is an object of the present invention to provide an improved family of multi-speed transmission mechanisms having three planetary gearsets and five torque-transmitting mechanisms.

In one aspect of the present invention, a first member of the first planetary gearset is continuously interconnected with a first member of the second planetary gearset through an interconnecting member.

In another aspect of the present invention, a second interconnecting member continuously interconnects a second member of the first planetary gearset with a first member of the third planetary gearset.

In yet another aspect of the present invention, a third interconnecting member continuously interconnects a second member of the second planetary gearset with a second member of the third planetary gearset.

In still another aspect of the present invention, a third member of the first planetary gearset is continuously connected with a stationary housing, such as a transmission case.

In yet still another aspect of the present invention, the transmission output shaft is continuously connected with at least one member of one of the planetary gearsets.

In a further aspect of the present invention, a first of the torque-transmitting mechanisms is selectively connectible between a transmission input shaft and a member of either the first or second planetary gearset.

In a yet further aspect of the present invention, a second of the torque-transmitting mechanisms is selectively connectible between the input shaft and a member of the second or third planetary gearset, or with one of the interconnecting members.

In still a further aspect of the present invention, a third of the torque-transmitting mechanisms is selectively connectible between the input shaft and at least one member of one of the planetary gearsets.

In yet still another aspect of the present invention, a fourth of the torque-transmitting mechanisms selectively interconnects a member of the first, second or third planetary gearset with a transmission housing, or selectively interconnects a member of the first, second, or third planetary gearset with another member of the first, second, or third planetary gearset.

In yet still a further aspect of the present invention, a fifth of the torque-transmitting mechanisms operates as a stationary torque-transmitting mechanism to interconnect a member of the second or third planetary gearset, or one of the interconnecting members with the stationary member, or acts a rotating type torque-transmitting mechanism to selectively interconnect a member of one of the planetary gearsets with either the output shaft or another member of one of the planetary gearsets.

In another aspect of the present invention, the torque-transmitting mechanisms are selectively engageable in combinations of two to provide at least six forward speed ratios and one reverse speed ratio between the input shaft and the output shaft of the transmission.

DESCRIPTION OF EXEMPLARY EMBODIMENTS

Figures 1, 2:
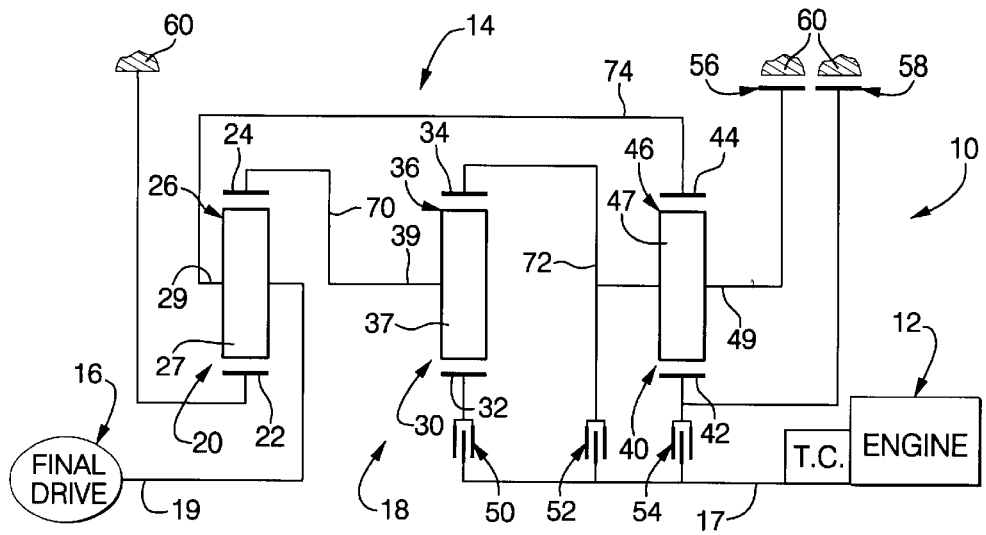
FIG. 1 is a schematic representation of a powertrain incorporating one embodiment of the present invention.
FIG. 2 is a truth table and chart depicting some of the operating characteristics of the powertrain shown in FIG. 1.

Referring to the drawings, wherein like characters represent the same or corresponding parts throughout the several views, there is seen in FIG. 1 a powertrain 10 having an engine and torque converter 12, a planetary transmission 14, and a final drive mechanism 16. The planetary transmission 14 includes an input shaft 17, a planetary gear arrangement 18, and an output shaft 19. The planetary gear arrangement 18 includes three planetary gearsets 20, 30, and 40, and five torque-transmitting mechanisms 50, 52, 54, 56, and 58. The torque-transmitting mechanisms 50, 52, and 54 are rotating type torque-transmitting mechanisms, commonly termed clutches. These devices are conventional fluid-operated friction type mechanisms well known in the art of power transmissions. The torque-transmitting mechanisms 56 and 58 are stationary torque-transmitting mechanisms, commonly termed brakes and are also well known fluid-operated selectively engageable mechanisms. The brakes 56 and 58 might be either disc-type brakes, often termed reaction clutches, or band-type brakes. Both of these assemblies or constructions are well known in the art of power transmissions.

The planetary gearset 20 includes a sun gear member 22, a ring gear member 24, and a planet carrier assembly member 26. The planet carrier assembly member 26 includes a plurality of pinion gears 27 rotatably mounted on a planet carrier 29 and disposed in meshing relationship with both the sun gear member 22 and the ring gear member 24. The schematic representation shows a single pinion gear member 27, however, as is well known at least three and often four pinion gears are mounted on a single carrier in power transmissions.

The planetary gearset 30 includes a sun gear member 32, a ring gear member 34, and a planet carrier assembly member 36. The planet carrier assembly member 36 includes a plurality of pinion gears 37 rotatably mounted on planet carrier 39 and disposed in meshing relationship with both the sun gear member 32 and the ring gear member 34. The schematic representation shows a single pinion gear member 37, however, as is well known at least three and often four pinion gears are mounted on a single carrier in power transmissions.

The planetary gearset 40 includes a sun gear member 42, a ring gear member 44, and a planet carrier assembly member 46. The planet carrier assembly member 46 includes a plurality of pinion gears 47 rotatably mounted on a planet carrier 49 and disposed in meshing relationship with both the sun gear member 42 and the ring gear member 44. The schematic representation shows a single pinion gear member 47, however, as is well known at least three and often four pinion gears are mounted on a single carrier in power transmissions.

The ring gear member 24 and the planet carrier assembly member 36 are continuously interconnected through an interconnecting member 70. The ring gear member 34 and the planet carrier assembly member 46 are continuously interconnected through an interconnecting member 72. The planet carrier assembly member 26, the ring gear member 44, and the output shaft 19 are continuously interconnected by an interconnecting member 74. The sun gear member 22 is continuously connected with a transmission housing or stationary component 60.

The torque-transmitting mechanism 50 is selectively interconnectible between the input shaft 17 and the sun gear member 32. The torque-transmitting mechanism 52 is selectively interconnectible between the input shaft 17 and the interconnecting member 72, which as recited above interconnects the ring gear member 34 and the planet carrier assembly member 46. The torque-transmitting mechanism 54 selectively interconnects the input shaft 17 and the sun gear member 42. The torque-transmitting mechanism 56 is selectively interconnectible between the interconnecting member 72 and the stationary housing 60. The torque-transmitting mechanism 58 is selectively interconnectible between the sun gear member 42 and the stationary housing 60. The sun gear member 32 and sun gear member 42 are not continuously interconnected with any other components of the planetary gear arrangement 18 other than the torque-transmitting mechanisms associated therewith. As can be readily seen in FIG. 1, the input shaft 17 is continuously connected with the engine and torque converter 12 and the output shaft 19 is continuously interconnected with the final drive mechanism 16.

The truth table shown in FIG. 2 describes the combinations of engagements for the torque-transmitting mechanisms that establish six forward speed ratios and one reverse speed ratio between the input shaft 17 and the output shaft 19. The truth table also provides a numerical example of ratios that might be attained utilizing the ring gear/sun gear tooth ratios given by way of example as R1/S1, R2/S2, and R3/S3, respectively. Also given in FIG. 2 is a chart of ratio steps between the adjacent forward speed ratios and between the reverse and first forward speed ratio.

As seen in the truth table, the reverse speed ratio is established with the engagement of the torque-transmitting mechanisms 54 and 56. With this combination of engagements, the ring gear member 44 and therefore output shaft 19 are driven at a speed determined by the speed of the sun gear member 42 and the ring gear/sun gear tooth ratio of the planetary gearset 40. The numerical value of the reverse speed ratio is determined by the ring gear/sun gear tooth ratio of the planetary gearset 40.

The first forward speed ratio is established with the engagement of the torque-transmitting mechanisms 56 and 50. During the first forward speed ratio, the planet carrier assembly member 36 and ring gear member 24 are driven at a speed determined by the speed of the sun gear member 32 and the ring gear/sun gear tooth ratio of the planetary gearset 30. The planet carrier assembly member 26 and therefore output shaft 19 are driven at a speed determined by the speed of the ring gear member 24 and the ring gear/sun gear tooth ratio of the planetary gearset 20. The numerical value of the first forward speed ratio is determined by the ring gear/sun gear tooth ratios of the planetary gearsets 20 and 30.

The second forward speed ratio is established with the engagement of the torque-transmitting mechanisms 50 and 58. During the second forward speed ratio, the ring gear member 34 and planet carrier assembly member 46 are rotated at a speed determined by the speed of the sun gear member 32, the speed of the planet carrier assembly member 36, and the ring gear/sun gear tooth ratio of the planetary gearset 30. The planet carrier assembly member 36 and ring gear member 24 are rotated at a speed determined by the speed of the planet carrier assembly member 26 and the ring gear/sun gear tooth ratio of the planetary gearset 20. The ring gear member 44 and planet carrier assembly member 26, and therefore output shaft 19, are rotated at a speed determined by the speed of the planet carrier assembly member 46 and the ring gear/sun gear tooth ratio of the planetary gearset 40. The numerical value of the second forward speed ratio is determined by the ring gear/sun gear tooth ratios of all three planetary gearsets 20, 30, and 40.

The third forward speed ratio is established with the engagement of the torque-transmitting mechanisms 50 and 54. During the third forward speed ratio, the sun gear members 32 and 42 are driven by the input shaft 17 through the respective torque-transmitting mechanisms 50 and 54. The sun gear member 22 is stationary. The ring gear member 24 and planet carrier assembly member 36 are rotating reaction members, as are the ring gear member 34 and the planet carrier assembly member 46. The speed of the ring gear member 34 and planet carrier assembly member 46 is determined by the speed of the sun gear member 32, the speed of the planet carrier assembly member 36, and the ring gear/sun gear tooth ratio of the planetary gearset 30. The planet carrier assembly member 36 and ring gear member 24 are rotated at a speed determined by the speed of the planet carrier assembly member 26 and the ring gear/sun gear tooth ratio of the planetary gearset 20. The ring gear member 44, the planet carrier assembly member 26 and therefore output shaft 19 are rotated at a speed determined by the speed of the of the sun gear member 42, the speed of the planet carrier assembly member 46, and the ring gear/sun gear tooth ratio of the planetary gearset 40. The numerical value of the third forward speed ratio is determined by the ring gear/sun gear tooth ratios of all three planetary gearsets 20, 30, and 40.

The fourth forward speed ratio is established with the engagement of the torque-transmitting mechanisms 50 and 52. With this combination of engagements, the planetary gearset 30 and ring gear member 24 are rotated in unison with the input shaft 17. The planet carrier assembly member 26 and therefore output shaft 19 are rotated at a speed determined by the speed of the input shaft 17 and the ring gear/sun gear tooth ratio of the planetary gearset 20. The numerical value of the fourth forward speed ratio is determined by the ring gear/sun gear tooth ratio of the planetary gearset 20.

The fifth forward speed ratio is established with the engagement of the torque-transmitting mechanisms 52 and 54. With this combination of engagements, the planetary gearset 40, planet carrier assembly member 26 and therefore output shaft 19 rotate in unison with the input shaft 17. The numerical value of the fifth forward speed ratio is one.

The sixth forward speed ratio is established with the engagement of the torque-transmitting mechanisms 52 and 58. During the sixth forward speed ratio, the planet carrier assembly member 46 is driven in unison with the input shaft 17. The ring gear member 44, planet carrier assembly member 26 and therefore output shaft 19 are driven at a speed determined by the speed of the planet carrier assembly member 46 and the ring gear/sun gear tooth ratio of the planetary gearset 40. The numerical value of the sixth forward speed ratio is determined by the ring gear/sun gear tooth ratio of the planetary gearset 40.

As seen in the truth table, the sixth forward speed ratio is an overdrive ratio, the first through fourth forward speed ratios are underdrive ratios, and the fifth forward speed ratio is a direct drive. Those skilled in the art will recognize upon reviewing the truth table of FIG. 2 that each of the single step forward interchanges are single transition ratio interchanges as are each of the double step forward interchanges.

Figures 3, 4:
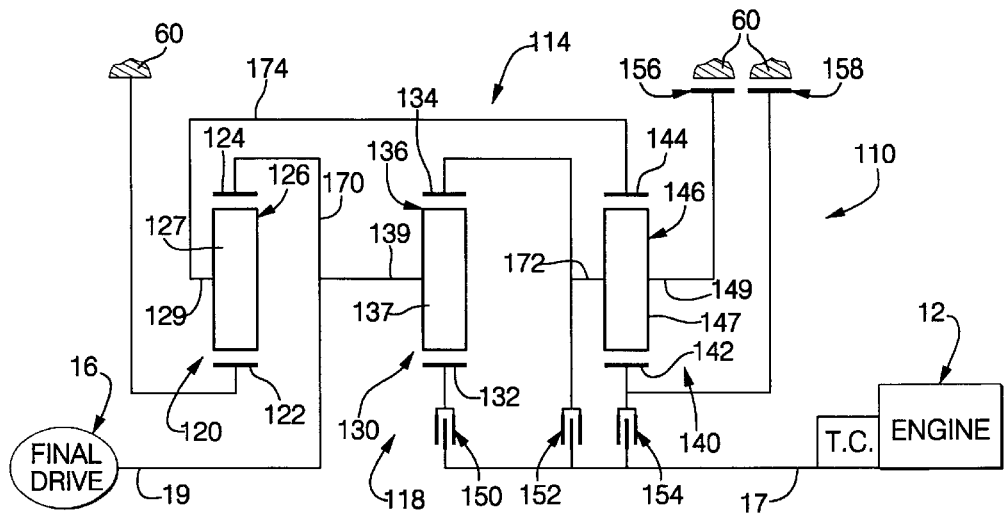
FIG. 3 is a schematic representation of a powertrain incorporating another embodiment of the present invention.
FIG. 4 is a truth table and chart depicting some of the operating characteristics of the powertrain shown in FIG. 3.

A powertrain 110, shown in FIG. 3, includes the engine and torque converter 12, a planetary transmission 114, and the final drive mechanism 16. The planetary transmission 114 includes the input shaft 17, a planetary gear arrangement 118, and the output shaft 19. The planetary gear arrangement 118 includes three planetary gearsets 120, 130, and 140, and five torque-transmitting mechanisms 150, 152, 154, 156, and 158. The torque-transmitting mechanisms 150, 152, and 154 are rotating type torque-transmitting mechanisms, and the torque-transmitting mechanisms 156 and 158 are stationary type torque-transmitting mechanisms.

The planetary gearset 120 includes a sun gear member 122, a ring gear member 124, and a planet carrier assembly member 126. The planet carrier assembly member 126 includes a plurality of pinion gears 127 rotatably mounted on a planet carrier 129 and disposed in meshing relationship with both the sun gear member 122 and the ring gear member 124.

The planetary gearset 130 includes a sun gear member 132, a ring gear member 134, and a planet carrier assembly member 136. The planet carrier assembly member 136 includes a plurality of pinion gears 137 rotatably mounted on planet carrier 139 and disposed in meshing relationship with both the sun gear member 132 and the ring gear member 134.

The planetary gearset 140 includes a sun gear member 142, a ring gear member 144, and a planet carrier assembly member 146. The planet carrier assembly member 146 includes a plurality of pinion gears 147 rotatably mounted on a planet carrier 149 and disposed in meshing relationship with both the sun gear member 142 and the ring gear member 144.

The ring gear member 124, planet carrier assembly member 136, and output shaft 19 are continuously interconnected by an interconnecting member 170. The ring gear member 134 and planet carrier assembly member 146 are continuously interconnected by an interconnecting member 172. The planet carrier assembly member 126 and ring gear member 144 are continuously interconnected by an interconnecting member 174. The sun gear member 122 is continuously connected with the transmission housing 60.

The input shaft 17 is selectively interconnectible with the sun gear member 132 through the torque-transmitting mechanism 150, with the interconnecting member 172 through the torque-transmitting mechanism 152, and with the sun gear member 142 through the torque-transmitting mechanism 154. The sun gear member 142 is selectively connectible with the transmission housing 60 through the torque-transmitting mechanism 158. The interconnecting member 172 is selectively connectible with the transmission housing 60 through the torque-transmitting mechanism 156.

The truth table of FIG. 4 describes the engagement sequence and combinations of the torque-transmitting mechanisms to establish six forward speed ratios and one reverse speed ratio between the input shaft 17 and the output shaft 19. The truth table also provides a numerical example of the speed ratios that are available with the planetary gear arrangement 118 when utilizing the ring gear/sun gear tooth ratios of the planetary gearsets 120, 130, and 140 depicted as R1/S1, R2/S2, and R3/S3, respectively. The chart of FIG. 4 describes the ratio steps between adjacent forward speed ratios as well as between the reverse and first forward speed ratio.

The reverse speed ratio is established with the engagement of the torque-transmitting mechanisms 154 and 156. During the reverse speed ratio, the ring gear member 144 and planet carrier assembly member 126 are driven at a speed determined by the speed of the sun gear member 142 and the ring gear/sun gear tooth ratio of the planetary gearset 140. The ring gear member 124 and therefore output shaft 19 are driven at a speed determined by the speed of the planet carrier assembly member 126 and the ring gear/sun gear tooth ratio of the planetary gearset 120. The numerical value of the reverse speed ratio is determined by the ring gear/sun gear tooth ratios of the planetary gearsets 120 and 140.

The first forward speed ratio is established with the engagement of the torque-transmitting mechanisms 150 and 156. During the first forward speed ratio, the speed of the planet carrier assembly member 136 and therefore output shaft 19 is determined by the speed of the sun gear member 132 and the ring gear/sun gear tooth ratio of the planetary gearset 130. The numerical value of the first forward speed ratio is driven at a speed determined by the speed of the ring gear/sun gear tooth ratio of the planetary gearset 130.

The second forward speed ratio is established with the engagement of the torque-transmitting mechanisms 150 and 158. During the second forward speed ratio, the ring gear member 134 and planet carrier assembly member 146 are driven at a speed determined by the speed of the sun gear member 132, the speed of the planet carrier assembly member 136, and the ring gear/sun gear tooth ratio of the planetary gearset 130. The ring gear member 144 and the planet carrier assembly member 126 are driven at a speed determined by the speed of the planet carrier assembly member 146 and the ring gear/sun gear tooth ratio of the planetary gearset 140. The ring gear member 124, planet carrier assembly member 136 and therefore output shaft 19 are driven at a speed determined by the speed of the planet carrier assembly member 126 and the ring gear/sun gear tooth ratio of the planetary gearset 120. The numerical value of the second forward speed ratio is determined by the ring gear/sun gear tooth ratios of all three planetary gearsets 120, 130, and 140.

The third forward speed ratio is established with the engagement of the torque-transmitting mechanisms 150 and 154. During the third forward speed ratio, the ring gear member 144 and planet carrier assembly member 126 are driven at a speed determined by the speed of the sun gear member 142, the speed of the planet carrier assembly member 146, and the ring gear/sun gear tooth ratio of the planetary gearset 140. The ring gear member 134 and planet carrier assembly member 146 are driven at a speed determined by the speed of the sun gear member 132, the speed of the planet carrier assembly member 136, and the ring gear/sun gear tooth ratio of the planetary gearset 130. The ring gear member 124, planet carrier assembly member 136, and the output shaft 19 are driven at a speed determined by the speed of the planet carrier assembly member 126, and the ring gear/sun gear tooth ratio of the planetary gearset 120. The numerical value of the third forward speed ratio is determined by the ring gear/sun gear tooth ratios of all three planetary gearsets 120, 130, and 140.

The fourth forward speed ratio is established with the engagement of the torque-transmitting mechanisms 150 and 152. With the engagement of these two torque-transmitting mechanisms the planetary gearset 130 and therefore output shaft 19 rotate in unison with the input shaft 17. The numerical value of the fourth forward speed ratio is one.

The fifth forward speed ratio is established with the engagement of the torque-transmitting mechanisms 152 and 154. During the fifth forward speed ratio, the planetary gearset 140 and planet carrier assembly member 126 are driven in unison with the input shaft 17. The ring gear member 124 and therefore output shaft 19 are driven at a speed determined by the speed of the planet carrier assembly member 126 and the ring gear/sun gear tooth ratio of the planetary gearset 120. The numerical value of the fifth forward speed ratio is determined by the ring gear/sun gear tooth ratio of the planetary gearset 120.

The sixth forward speed ratio is established with the engagement of the torque-transmitting mechanisms 152 and 158. During the sixth forward speed ratio, the ring gear member 144 and planet carrier assembly member 126 are driven at a speed determined by the speed of the planet carrier assembly member 146 and the ring gear/sun gear tooth ratio of the planetary gearset 140. The ring gear member 124 and therefore output shaft 19 are driven at a speed determined by the speed of the planet carrier assembly member 126 and the ring gear/sun gear tooth ratio of the planetary gearset 120. The numerical value of the sixth forward speed ratio is determined by the ring gear/sun gear tooth ratios of the planetary gearsets 120 and 140.

Figures 5, 6:
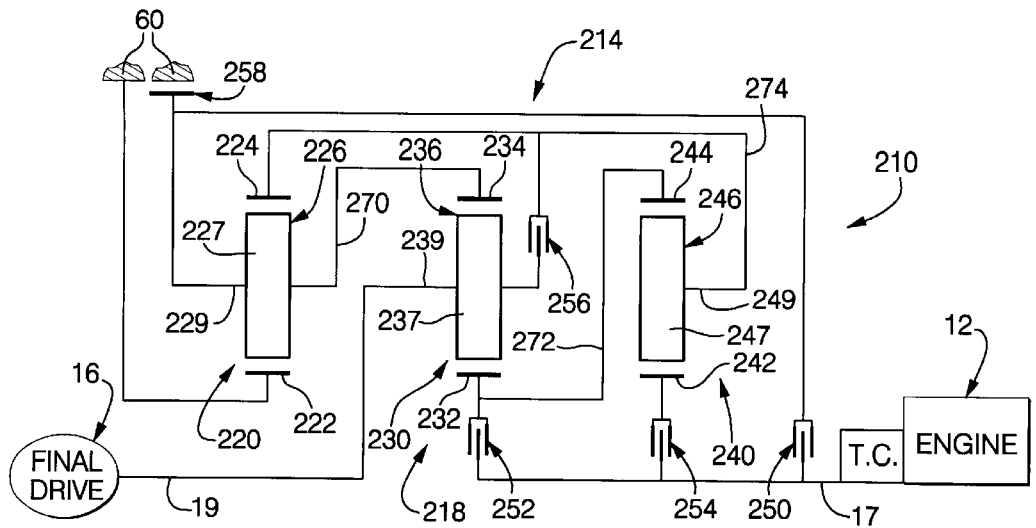
FIG. 5 is a schematic representation of a powertrain incorporating another embodiment of the present invention.
FIG. 6 is a truth table and chart depicting some of the operating characteristics of the powertrain shown in FIG. 5.

A powertrain 210, shown in FIG. 5, includes the engine and torque converter 12, a planetary transmission 214, and the final drive mechanism 16. The planetary transmission 214 includes the input shaft 17, a planetary gear arrangement 218, and the output shaft 19. The planetary gear arrangement 218 includes three planetary gearsets 220, 230, and 240, and five torque-transmitting mechanisms 250, 252, 254, 256, and 258. The torque-transmitting mechanisms 250, 252, 254, and 256 are rotating type torque-transmitting mechanisms, and the torque-transmitting mechanism 158 is a stationary type torque-transmitting mechanism.

The planetary gearset 220 includes a sun gear member 222, a ring gear member 224, and a planet carrier assembly member 226. The planet carrier assembly member 226 includes a plurality of pinion gears 227 rotatably mounted on a planet carrier 229 and disposed in meshing relationship with both the sun gear member 222 and the ring gear member 224.

The planetary gearset 230 includes a sun gear member 232, a ring gear member 234, and a planet carrier assembly member 236. The planet carrier assembly member 236 includes a plurality of pinion gears 237 rotatably mounted on planet carrier 239 and disposed in meshing relationship with both the sun gear member 232 and the ring gear member 234.

The planetary gearset 240 includes a sun gear member 242, a ring gear member 244, and a planet carrier assembly member 246. The planet carrier assembly member 246 includes a plurality of pinion gears 247 rotatably mounted on a planet carrier 249 and disposed in meshing relationship with both the sun gear member 242 and the ring gear member 244.

The planet carrier assembly member 226 and ring gear member 234 are continuously interconnected by an interconnecting member 270. The sun gear member 232 and ring gear member 244 are continuously interconnected by an interconnecting member 272. The ring gear member 224 and planet carrier assembly member 246 are continuously interconnected by an interconnecting member 274. The sun gear member 222 is continuously connected with the transmission housing 60.

The input shaft 17 is selectively connectible with the interconnecting member 270 through the torque-transmitting mechanism 250, with the interconnecting member 272 through the torque-transmitting mechanism 252, and with the sun gear member 242 through the torque-transmitting mechanism 254. The interconnecting member 274 is selectively interconnectible with the planet carrier assembly member 236 and therefore output shaft 19 through the torque-transmitting mechanism 256. The interconnecting member 270 is selectively connectible with transmission housing 60 through the torque-transmitting mechanism 258. The sun gear member 242 is a noncontinuously connected member of the planetary gear arrangement 218. The sun gear member 242 is interconnectible with other components only through the torque-transmitting mechanism 254.

The truth table shown in FIG. 6 describes the combination of engagements of the torque-transmitting mechanisms, as well as the sequence of engagement of the torque-transmitting mechanisms, in order to provide six forward speed ratios and one reverse speed ratio between the input shaft 17 and the output shaft 19.

The reverse speed ratio is established with the engagement of the torque-transmitting mechanisms 254 and 256. During the reverse speed ratio, the ring gear member 244 and sun gear member 232 are rotated at a speed determined by the speed of the sun gear member 242, the speed of the planet carrier assembly member 246, and the ring gear/sun gear tooth ratio of the planetary gearset 240. The ring gear member 234 and planet carrier assembly member 226 are driven at a speed determined by the speed of the sun gear member 232, the speed of the planet carrier assembly member 236, and the ring gear/sun gear tooth ratio of the planetary gearset 230. The ring gear member 224, planet carrier assembly member 246, planet carrier assembly member 236, and therefore output shaft 19, are driven at a speed determined by the speed of the planet carrier assembly member 226 and the ring gear/sun gear tooth ratio of the planetary gearset 220. The numerical value of the reverse speed ratio is determined by the ring gear/sun gear tooth ratios of all three planetary gearsets 220, 230, and 240.

The first forward speed ratio is established with the engagement of the torque-transmitting mechanisms 252 and 258. During the first forward speed ratio, the planet carrier assembly member 236 is driven at a speed determined by the speed of the sun gear member 232 and the ring gear/sun gear tooth ratio of the planetary gearset 230. The numerical value of the first forward speed ratio is determined by the ring gear/sun gear tooth ratio of the planetary gearset 230. It will be noted that during the first forward speed ratio the ring gear member 234 is held stationary by the torque-transmitting mechanism 258.

The second forward speed ratio is established with the engagement of the torque-transmitting mechanisms 252 and 256. During the second forward speed ratio, the ring gear member 234 and planet carrier assembly member 226 are rotated at a speed determined by the speed of the sun gear member 232, the speed of the planet carrier assembly member 236, and the ring gear/sun gear tooth ratio of the planetary gearset 230. The ring gear member 224, planet carrier assembly member 236 and therefore output shaft 19 are rotated at a speed determined by the speed of the planet carrier assembly member 226 and the ring gear/sun gear tooth ratio of the planetary gearset 220. The numerical value of the second forward speed ratio is determined by the ring gear/sun gear tooth ratios of the planetary gearsets 220 and 230.

The third forward speed ratio is established with the engagement of the torque-transmitting mechanisms 252 and 254. During the third forward speed ratio, the planet carrier assembly member 226 and ring gear member 234 are rotated at a speed determined by the speed of the ring gear member 224 (input) and the ring gear/sun gear tooth ratio of the planetary gearset 220. The planet carrier assembly member 236 and therefore output shaft 19 are rotated at a speed determined by the speed of the ring gear member 234, the speed of the sun gear member 232, and the ring gear/sun gear tooth ratio of the planetary gearset 230. The numerical value of third forward speed ratio is determined by the ring gear/sun gear tooth ratios of the planetary gearsets 220 and 230.

The fourth forward speed ratio is established with the engagement of the torque-transmitting mechanisms 250 and 252. With this combination of engagements, the planetary gearset 230 is rotated as a single unit such that the input shaft 17 and the output shaft 19 rotate in unison. The numerical value of the fourth forward speed ratio is one.

The fifth forward speed ratio is established with the engagement of the torque-transmitting mechanisms 250 and 254. During the fifth forward speed ratio, the ring gear member 224 and planet carrier assembly member 246 are rotated at a speed determined by the speed of the planet carrier assembly member 226 and the ring gear/sun gear tooth ratio of the planetary gearset 220. The ring gear member 244 and sun gear member 232 are rotated at a speed determined by the speed of the sun gear member 242, the speed of the planet carrier assembly member 246, and the ring gear/sun gear tooth ratio of the planetary gearset 240. The planet carrier assembly member 236 and therefore output shaft 19 are rotated at a speed determined by the speed of the sun gear member 232, the speed of the ring gear member 234, and the ring gear/sun gear tooth ratio of the planetary gearset 230. The numerical value of the fifth forward speed ratio is determined by the ring gear/sun gear tooth ratios of all three planetary gearsets 220, 230, and 240.

The sixth forward speed ratio is established with the engagement of the torque-transmitting mechanisms 250 and 256. During the sixth forward speed ratio, the ring gear member 224, planet carrier assembly member 246, and therefore output shaft 19 are driven at a speed determined by the speed of the planet carrier assembly member 226 (input) and the ring gear/sun gear tooth ratio of the planetary gearset 220. The numerical value of the sixth forward speed ratio is determined by the ring gear/sun gear tooth ratio of the planetary gearset 220.

Figures 7, 8:
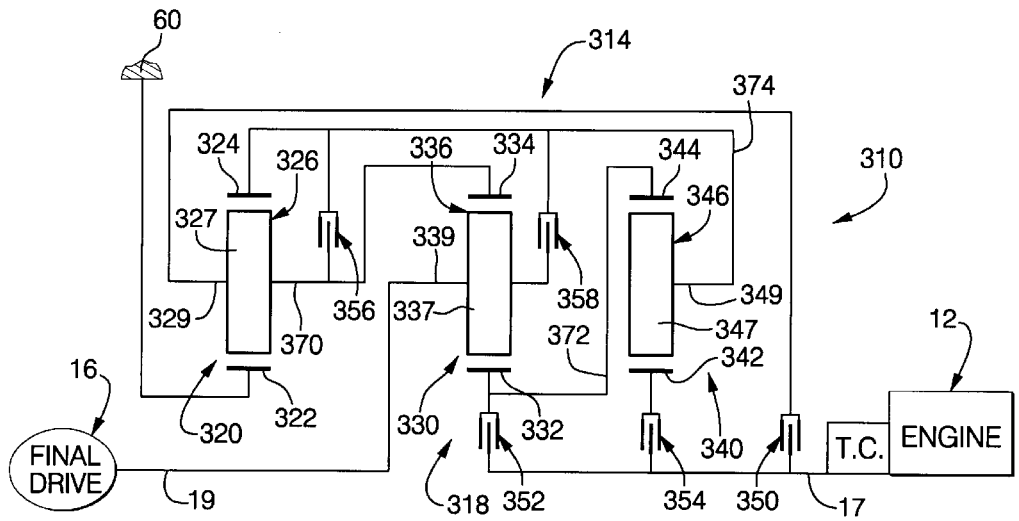
FIG. 7 is a schematic representation of a powertrain incorporating another embodiment of the present invention.
FIG. 8 is a truth table and chart depicting some of the operating characteristics of the powertrain shown in FIG. 7.

A powertrain 310, shown in FIG. 7, includes the engine and torque converter 12, a planetary transmission 314, and the final drive mechanism 16. The planetary transmission 314 includes the input shaft 17, a planetary gear arrangement 318, and the output shaft 19. The planetary gear arrangement 318 includes three planetary gearsets 320, 330, and 340, and five torque-transmitting mechanisms 350, 352, 354, 356, and 358. All of the torque-transmitting mechanisms are rotating type torque-transmitting mechanisms.

The planetary gearset 320 includes a sun gear member 322, a ring gear member 324, and a planet carrier assembly member 326. The planet carrier assembly member 326 includes a plurality of pinion gears 327 rotatably mounted on a planet carrier 329 and disposed in meshing relationship with both the sun gear member 322 and the ring gear member 324.

The planetary gearset 330 includes a sun gear member 332, a ring gear member 334, and a planet carrier assembly member 336. The planet carrier assembly member 336 includes a plurality of pinion gears 337 rotatably mounted on planet carrier 339 and disposed in meshing relationship with both the sun gear member 332 and the ring gear member 334.

The planetary gearset 340 includes a sun gear member 342, a ring gear member 344, and a planet carrier assembly member 346. The planet carrier assembly member 346 includes a plurality of pinion gears 347 rotatably mounted on a planet carrier 349 and disposed in meshing relationship with both the sun gear member 342 and the ring gear member 344.

The planet carrier assembly member 326 is continuously connected with the ring gear member 334 through an interconnecting member 370. The sun gear member 332 and ring gear member 344 are continuously interconnected through an interconnecting member 372. The ring gear member 324 and planet carrier assembly member 346 are continuously interconnected through an interconnecting member 374. The sun gear member 322 is continuously connected with the transmission housing 60. The planet carrier assembly member 336 is continuously connected with output shaft 19.

The input shaft 17 is selectively connectible with the interconnecting member 370 through the torque-transmitting mechanism 350, selectively connectible with the interconnecting member 372 through the torque-transmitting mechanism 352, and with the sun gear member 342 through the torque-transmitting mechanism 354. The interconnecting member 370 is selectively interconnectable with the interconnecting member 374 through the torque-transmitting mechanism 356. The interconnecting member 374 is selectively connectible with the planet carrier assembly member 336 and therefore output shaft 19 through the torque-transmitting mechanism 358. The sun gear member 342 is a noncontinuously connected member in that it is only connected with the other members of the planetary gear arrangement 318 through the torque-transmitting mechanism 354.

The truth table of FIG. 8 provides a pictorial representation of the engagement combinations and the sequence of engagements for the torque-transmitting mechanisms in order to provide a reverse speed ratio and six forward speed ratios between the input shaft 17 and the output shaft 19. The truth table also provides a numerical example of speed ratios that are available in the planetary gear arrangement 318 when utilizing the ring gear/sun gear tooth ratios of the planetary gearsets 320, 330, and 340 given as R1/S1, R2/S2, and R3/S3, respectively. Also provided in FIG. 8 is a chart describing the values of ratio steps between adjacent forward speed ratios and between the reverse and first forward speed ratio when utilizing the given numerical speed ratios.

The reverse speed ratio is established with the engagement of the torque-transmitting mechanisms 354 and 358. During the reverse speed ratio, the ring gear member 344 and sun gear member 332 are rotated at a speed determined by the speed of sun gear member 342, the speed of planet carrier assembly member 346, and the ring gear/sun gear tooth ratio of the planetary gearset 340. The ring gear member 334 and planet carrier assembly member 326 are rotated at a speed determined by the speed of the sun gear member 332, the speed of the planet carrier assembly member 336, and the ring gear/sun gear tooth ratio of the planetary gearset 330. The ring gear member 324, planet carrier assembly member 346, planet carrier assembly member 336, and therefore output shaft 19, are rotated at a speed determined by the speed of the planet carrier assembly member 326 and the ring gear/sun gear tooth ratio of the planetary gearset 320. The numerical value of the reverse speed ratio is determined by the ring gear/sun gear tooth ratios of all three planetary gearsets 320, 330, and 340.

The first forward speed ratio is established with the engagement of the torque-transmitting mechanisms 352 and 356. During the first forward speed ratio the ring gear member 334 is held stationary. The planet carrier assembly member 336 and therefore output shaft 19 are driven at a speed determined by the speed of the sun gear member 332 and the ring gear/sun gear tooth ratio of the planetary gearset 330. The numerical value of the first forward speed ratio is determined by the ring gear/sun gear tooth ratio of the planetary gearset 330.

The second forward speed ratio is established with the engagement of the torque-transmitting mechanisms 352 and 358. During the second forward speed ratio, the ring gear member 334 and planet carrier assembly member 326 are rotated at a speed determined by the speed of the sun gear member 332, the speed of the planet carrier assembly member 336, and the ring gear/sun gear tooth ratio of the planetary gearset 330. The ring gear member 324, planet carrier assembly member 336, and therefore output shaft 19 are rotated at a speed determined by the speed of the planet carrier assembly member 326 and the ring gear/sun gear tooth ratio of the planetary gearset 320. The numerical value of the second forward speed ratio is determined by the ring gear/sun gear tooth ratios of the planetary gearsets 320 and 330.

The third forward speed ratio is established with the engagement of the torque-transmitting mechanisms 352 and 354. During the third forward speed ratio, the ring gear member 324 is driven directly by the input shaft 17. The planet carrier assembly member 326 and therefore ring gear member 334 are rotated at a speed determined by the speed of the ring gear member 324 and the ring gear/sun gear tooth ratio of the planetary gearset 320. The planet carrier assembly member 336 and therefore output shaft 19 are rotated at a speed determined by the speed of the sun gear member 332, the speed of the ring gear member 334, and the ring gear/sun gear tooth ratio of the planetary gearset 330. The numerical value of the third forward speed ratio is determined by the ring gear/sun gear tooth ratios of the planetary gearsets 320 and 330.

The fourth forward speed ratio is established with the engagement of the torque-transmitting mechanisms 350 and 352. With the engagement of these two torque-transmitting mechanisms, the planetary gearset 330 and therefore output shaft 19 are driven in unison with the input shaft 17. The numerical value of the fourth forward speed ratio is one.

The fifth forward speed ratio is established with the engagement of the torque-transmitting mechanisms 350 and 354. During the fifth forward speed ratio, the ring gear member 324 and planet carrier assembly member 346 are rotated at a speed determined by the speed of the planet carrier assembly member 326 and the ring gear/sun gear tooth ratio of the planetary gearset 320. The ring gear member 344 and sun gear member 332 are rotated at a speed determined by the speed of the planet carrier assembly member 346, the speed of the sun gear member 342, and the ring gear/sun gear tooth ratio of the planetary gearset 340. The planet carrier assembly member 336 and therefore output shaft 19 are rotated at a speed determined by the speed of the ring gear member 334, the speed of the sun gear member 332, and the ring gear/sun gear tooth ratio of the planetary gearset 330. The numerical value of the fifth forward speed ratio is determined by the ring gear/sun gear tooth ratios of all three planetary gearsets 320, 330, and 340.

The sixth forward speed ratio is established with the engagement of the torque-transmitting mechanisms 350 and 358. During the sixth forward speed ratio, the ring gear member 324, planet carrier assembly member 336, and therefore output shaft 19 are rotated at a speed determined by the speed of the planet carrier assembly member 326 and the ring gear/sun gear tooth ratio of the planetary gearset 320. The numerical value of the sixth forward speed ratio is determined by the ring gear/sun gear tooth ratio of the planetary gearset 320.

Figures 9, 10:
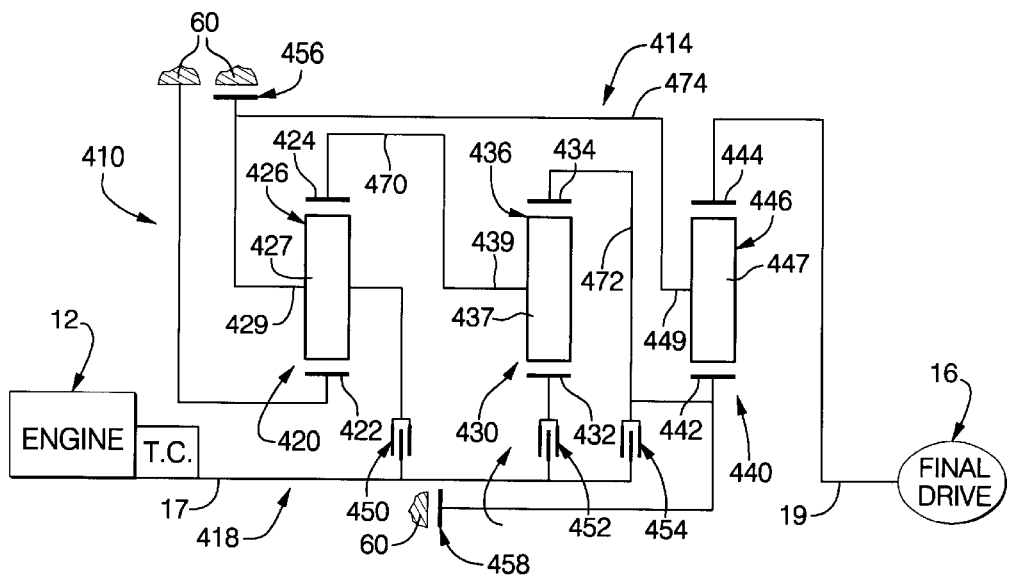
FIG. 9 is a schematic representation of a powertrain incorporating another embodiment of the present invention.
FIG. 10 is a truth table and chart depicting some of the operating characteristics of the powertrain shown in FIG. 9.

A powertrain 410, shown in FIG. 9, includes the engine and torque converter 12, a planetary transmission 414, and the final drive mechanism 16. The planetary transmission 414 includes the input shaft 17, a planetary gear arrangement 418, and the output shaft 19. The planetary gear arrangement 418 includes three planetary gearsets 420, 430, and 440, and five torque-transmitting mechanisms 450, 452, 454, 456, and 458. The torque-transmitting mechanisms 450, 452, and 454 are rotating type torque-transmitting mechanisms, and the torque-transmitting mechanisms 456 and 458 are stationary type torque-transmitting mechanisms.

The planetary gearset 420 includes a sun gear member 422, a ring gear member 424, and a planet carrier assembly member 426. The planet carrier assembly member 426 includes a plurality of pinion gears 427 rotatably mounted on a planet carrier 429 and disposed in meshing relationship with both the sun gear member 422 and the ring gear member 424.

The planetary gearset 430 includes a sun gear member 432, a ring gear member 434, and a planet carrier assembly member 436. The planet carrier assembly member 436 includes a plurality of pinion gears 437 rotatably mounted on planet carrier 439 and disposed in meshing relationship with both the sun gear member 432 and the ring gear member 434.

The planetary gearset 440 includes a sun gear member 442, a ring gear member 444, and a planet carrier assembly member 446. The planet carrier assembly member 446 includes a plurality of pinion gears 447 rotatably mounted on a planet carrier 449 and disposed in meshing relationship with both the sun gear member 442 and the ring gear member 444.

The ring gear member 424 is continuously interconnected with the planet carrier assembly member 436 through a continuous interconnecting member 470. The ring gear member 434 and sun gear member 442 are continuously interconnected by an interconnecting member 472. The planet carrier assembly member 426 and planet carrier assembly member 446 are continuously interconnected by an interconnecting member 474. The sun gear member 422 is continuously connected with the transmission housing 60. The ring gear member 444 is continuously connected with the output shaft 19.

The input shaft 17 is selectively connectible with the interconnecting member 474 through the torque-transmitting mechanism 450, selectively connectible with the sun gear member 432 through the torque-transmitting mechanism 452, and selectively connectible with the interconnecting member 472 through the torque-transmitting mechanism 454. The interconnecting member 474 is selectively connectible with the transmission housing 60 through the torque-transmitting mechanism 456. The interconnecting member 472 is selectively connectible with the transmission housing 60 through torque-transmitting mechanism 458. The sun gear member 432 is a noncontinuously interconnected member in that the sun gear member 432 is only interconnected with other elements of the planetary transmission 414 through the selective operation of the torque-transmitting mechanism 452.

As seen in FIG. 10, the torque-transmitting mechanisms are engaged in combinations of two to provide six forward speed ratios and one reverse speed ratio. It will be noted that each of the single step and double step interchanges in the forward direction are of the single transition variety. The truth table also provides an example of numerical values for the speed ratios that are obtained in the planetary gear arrangement 418 when utilizing the ring gear/sun gear tooth ratios of the planetary gearsets 420, 430, and 440 given as R1/S1, R2/S2, and R3/S3, respectively. Also given in FIG. 10 is a chart of the ratio steps which are available between adjacent forward speed ratios as well as between the reverse and first forward speed ratio when the given ring gear/sun gear tooth ratio values are employed.

The reverse speed ratio is established with the engagement of the torque-transmitting mechanisms 454 and 456. During the reverse speed ratio, the planet carrier assembly member 446 is held stationary. The ring gear member 444 and therefore output shaft 19 are driven at a speed determined by the speed of the sun gear member 442 and the ring gear/sun gear tooth ratio of the planetary gearset 440. The numerical value of the reverse speed ratio is determined by ring gear/sun gear tooth ratio of the planetary gearset 440.

The first forward speed ratio is established with the engagement of the torque-transmitting mechanisms 456 and 452. During the first forward speed ratio, the ring gear member 434 and sun gear member 442 are rotated at a speed determined by the speed of the sun gear member 432 and the ring gear/sun gear tooth ratio of the planetary gearset 430. The ring gear member 444 and output shaft 19 are rotated at a speed determined by the speed of the sun gear member 442 and the ring gear/sun gear tooth ratio of the planetary gearset 440. The numerical value of the first forward speed ratio is determined by the ring gear/sun gear tooth ratios of the planetary gearsets 430 and 440.

The second forward speed ratio is established with the engagement of the torque-transmitting mechanisms 452 and 458. During the second forward speed ratio, the planet carrier assembly member 436 and ring gear member 424 are rotated at a speed determined by the speed of the sun gear member 432 and the ring gear/sun gear tooth ratio of the planetary gearset 430. The planet carrier assembly member 426 and planet carrier assembly member 446 are rotated at a speed determined by the speed of the ring gear member 424 and the ring gear/sun gear tooth ratio of the planetary gearset 420. The ring gear member 444 and therefore output shaft 19 are rotated at a speed determined by the speed of the planet carrier assembly member 446 and the ring gear/sun gear tooth ratio of the planetary gearset 440. The numerical value of the second forward speed ratio is determined by the ring gear/sun gear tooth ratios of all three planetary gearsets 420, 430, and 440.

The third forward speed ratio is established with the engagement of the torque-transmitting mechanisms 452 and 454. During the third forward speed ratio, the ring gear member 424 is rotated in unison with the input shaft 17. The planet carrier assembly member 426 and planet carrier assembly member 446 are rotated at a speed determined by the speed of the ring gear member 424 and the ring gear/sun gear tooth ratio of the planetary gearset 420. The ring gear member 444 and therefore output shaft 19 are rotated at a speed determined by the speed of the sun gear member 442, the speed of the planet carrier assembly member 446, and the ring gear/sun gear tooth ratio of the planetary gearset 440. The numerical value of the third forward speed ratio is determined by the ring gear/sun gear tooth ratios of the planetary gearsets 420 and 440.

The fourth forward speed ratio is established with the engagement of the torque-transmitting mechanisms 450 and 452. During the fourth forward speed ratio, the ring gear member 424 and planet carrier assembly member 436 are rotated at a speed determined by the speed of the planet carrier assembly member 426 and the ring gear/sun tooth ratio of the planetary gearset 420. The ring gear member 434 and sun gear member 442 are rotated at a speed determined by the speed of the sun gear member 432, the speed of the planet carrier assembly member 436, and the ring gear/sun gear tooth ratio of the planetary gearset 430. The ring gear member 444 and therefore output shaft 19 are rotated at a speed determined by the speed of the sun gear member 442, the speed of the planet carrier assembly member 446, and the ring gear/sun gear tooth ratio of the planetary gearset 440. The numerical value of the fourth forward speed ratio is determined by the ring gear/sun gear tooth ratios of all three planetary gearsets 420, 430, and 440.

The fifth forward speed ratio is established with the engagement of the torque-transmitting mechanisms 450 and 454. During the fifth forward speed ratio, the sun gear member 442, planet carrier assembly member 446 and therefore ring gear member 444 are rotated in unison with the input shaft 17. Thus, the fifth forward speed ratio is a direct drive having a numerical value of one.

The sixth forward speed ratio is established with the engagement of the torque-transmitting mechanisms 450 and 458. During the sixth forward speed ratio, the planet carrier assembly member 446 is driven in unison with the input shaft 17. The ring gear member 444 and therefore output shaft 19 rotate at a speed determined by the speed of the planet carrier assembly member 446 and the ring gear/sun gear tooth ratio of the planetary gearset 440. The numerical value of the sixth forward speed ratio is determined by the ring gear/sun gear tooth ratio of the planetary gearset 440.

Figures 11, 12:
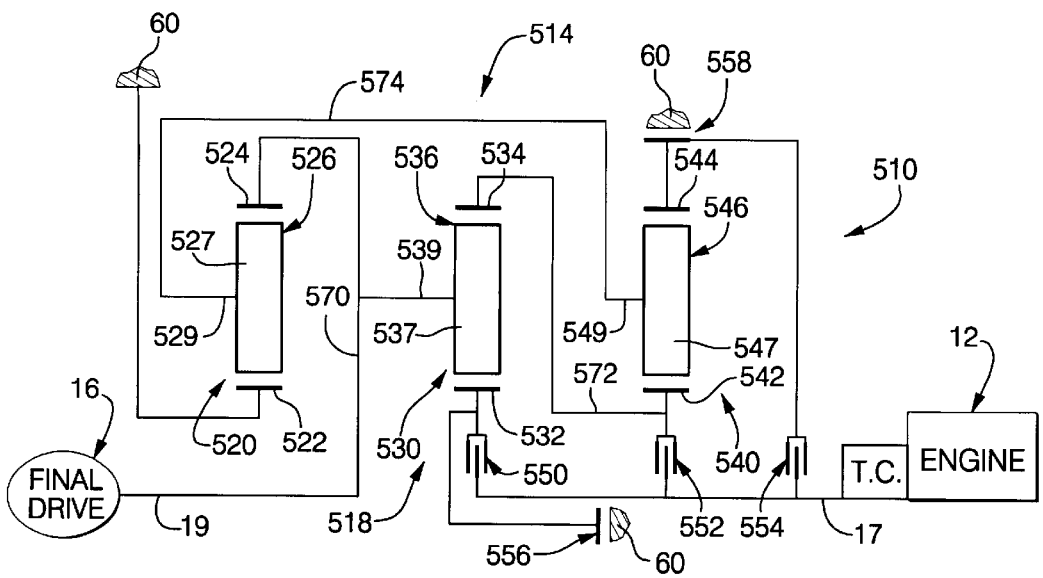
FIG. 11 is a schematic representation of a powertrain incorporating another embodiment of the present invention.
FIG. 12 is a truth table and chart depicting some of the operating characteristics of the powertrain shown in FIG. 11.

A powertrain 510, shown in FIG. 11, includes the engine and torque converter 12, a planetary transmission 514, and the final drive mechanism 16. The planetary transmission 514 includes the input shaft 17, a planetary gear arrangement 518, and the output shaft 19. The planetary gear arrangement 518 includes three planetary gearsets 520, 530, and 540, and five torque-transmitting mechanisms 550, 552, 554, 556, and 558. The torque-transmitting mechanisms 550, 552, and 554 are rotating type torque-transmitting mechanisms, and the torque-transmitting mechanisms 556 and 558 are stationary type torque-transmitting mechanisms.

The planetary gearset 520 includes a sun gear member 522, a ring gear member 524, and a planet carrier assembly member 526. The planet carrier assembly member 526 includes a plurality of pinion gears 527 rotatably mounted on a planet carrier 529 and disposed in meshing relationship with both the sun gear member 522 and the ring gear member 524.

The planetary gearset 530 includes a sun gear member 532, a ring gear member 534, and a planet carrier assembly member 536. The planet carrier assembly member 536 includes a plurality of pinion gears 537 rotatably mounted on planet carrier 539 and disposed in meshing relationship with both the sun gear member 532 and the ring gear member 534.

The planetary gearset 540 includes a sun gear member 542, a ring gear member 544, and a planet carrier assembly member 546. The planet carrier assembly member 546 includes a plurality of pinion gears 547 rotatably mounted on a planet carrier 549 and disposed in meshing relationship with both the sun gear member 542 and the ring gear member 544.

The sun gear member 522 is continuously connected with the transmission housing 60. The ring gear member 524 and planet carrier assembly member 536 are continuously interconnected with an interconnecting member 570 which is also connected with the output shaft 19. The ring gear member 534 and sun gear member 542 are continuously interconnected by an interconnecting member 572. The planet carrier assembly member 526 and planet carrier assembly member 546 are continuously interconnected by an interconnecting member 574.

The input shaft 17 is selectively connectible with the sun gear member 532 through the torque-transmitting mechanism 550, selectively connectible with the interconnecting member 572 through the torque-transmitting mechanism 552, and selectively connectible with the ring gear member 544 through the torque-transmitting mechanism 554. The sun gear member 532 is selectively connectible with the transmission housing 60 through the torque-transmitting mechanism 556. The ring gear member 544 is selectively connectible with the transmission housing 60 through the torque-transmitting mechanism 558. The sun gear member 532 and ring gear member 544 are not continuously interconnected with any of the other members or components of the planetary gear arrangement 518 except through the selective engagement of the torque-transmitting mechanisms 550 and 556, and 554 and 558, respectively.

The truth table shown in FIG. 12 provides a pictorial representation of the combination of engagements for the torque-transmitting mechanisms, as well as the sequence of engagements during the first six forward speed ratios. The truth table also provides an example of numerical values that can be obtained with the planetary gear arrangement 518 when utilizing the ring gear/sun gear tooth ratios of the planetary gearsets 520, 530, and 540 that are given by way of example as R1/S1, R2/S2, and R3/S3.

To establish the reverse speed ratio, the torque-transmitting mechanisms 550 and 558 are engaged. During the reverse speed ratio, the ring gear member 534 and sun gear member 542 are driven at a speed determined by the speed of the sun gear member 532, the speed of the planet carrier assembly member 536, and the ring gear/sun gear tooth ratio of the planetary gearset 530. The planet carrier assembly member 546 and planet carrier assembly member 526 are driven at a speed determined by the speed of the sun gear member 542 and the ring gear/sun gear tooth ratio of the planetary gearset 540. The ring gear member 524, planet carrier assembly member 536, and therefore output shaft 19 are driven at a speed determined by the speed of the planet carrier assembly member 526 and the ring gear/sun gear tooth ratio of the planetary gearset 520. The numerical value of the reverse speed ratio is determined by the ring gear/sun gear tooth ratios of all three planetary gearsets 520, 530, and 540.

The first forward speed ratio is established with the engagement of the torque-transmitting mechanisms 552 and 558. During the first forward speed ratio, the planet carrier assembly member 546 and planet carrier assembly member 526 are driven at a speed determined by the speed of the sun gear member 542 and the ring gear/sun gear tooth ratio of the planetary gearset 540. The ring gear member 524, planet carrier assembly member 536, and output shaft 19 are driven at a speed determined by the speed of the planet carrier assembly member 526 and the ring gear/sun gear tooth ratio of the planetary gearset 520. The numerical value of the first forward speed ratio is determined by the ring gear/sun gear tooth ratios of the planetary gearsets 520 and 540.

The second forward speed ratio is established with the engagement of the torque-transmitting mechanisms 552 and 556. During the second forward speed ratio, the ring gear member 534 is driven by the input shaft 17. The planet carrier assembly member 536 and therefore output shaft 19 are rotated at a speed determined by the speed of the ring gear member 534 and the ring gear/sun gear tooth ratio of the planetary gearset 530. The numerical value of the second forward speed ratio is determined by the ring gear/sun gear tooth ratio of the planetary gearset 530.

The third forward speed ratio is established with the engagement of the torque-transmitting mechanisms 550 and 552. With this combination of engagements, the ring gear member 534 and sun gear member 532, and therefore planet carrier assembly member 536 and output shaft 19, are driven directly by the input shaft 17. The third forward speed ratio is therefore a direct drive having a numerical value of one.

The fourth forward speed ratio is established with the engagement of the torque-transmitting mechanisms 552 and 554. During the fourth forward speed ratio, the planetary gearset 540 and planet carrier assembly member 526 rotate in unison with the input shaft 17. The speed of the ring gear member 524 and therefore output shaft 19 are determined by the speed of the planet carrier assembly member 526 and the ring gear/sun gear tooth ratio of the planetary gearset 520. The numerical value of the fourth forward speed ratio is determined by the ring gear/sun gear tooth ratio of the planetary gearset 520.

The fifth forward speed ratio is established with engagement of the torque-transmitting mechanisms 550 and 554. During the fifth forward speed ratio, the ring gear member 534 and sun gear member 542 are driven at a speed determined by the speed of the sun gear member 532, the speed of the planet carrier assembly member 536, and the ring gear/sun gear tooth ratio of the planetary gearset 530. The planet carrier assembly member 546 and planet carrier assembly member 526 are driven at a speed determined by the speed of the sun gear member 542, the speed of the ring gear member 544, and the ring gear/sun gear tooth ratio of the planetary gearset 540. The ring gear member 524, planet carrier assembly member 536, and therefore output shaft 19 are driven at a speed determined by the speed of the planet carrier assembly member 526 and the ring gear/sun gear tooth ratio of the planetary gearset 520. The numerical value of the fifth forward speed ratio is determined by the ring gear/sun gear tooth ratios of all three planetary gearsets 520, 530, and 540.

The sixth forward speed ratio is established with the engagement of the torque-transmitting mechanisms 554 and 556. During the sixth forward speed ratio, the planet carrier assembly member 546 and planet carrier assembly member 526 are rotated at a speed determined by the speed of the ring gear member 544, the speed of the sun gear member 542, and the ring gear/sun gear tooth ratio of the planetary gearset 540. The ring gear member 534 and sun gear member 542 are rotated at a speed determined by the speed of the planet carrier assembly member 536. The ring gear member 524, planet carrier assembly member 536, and output shaft 19 are driven at a speed determined by the speed of the planet carrier assembly member 526 and the ring gear/sun gear tooth ratio of the planetary gearset 520. The numerical value of the sixth forward speed ratio is determined by the ring gear/sun gear tooth ratios of all three planetary gearsets 520, 530, and 540.

Figures 13, 14:
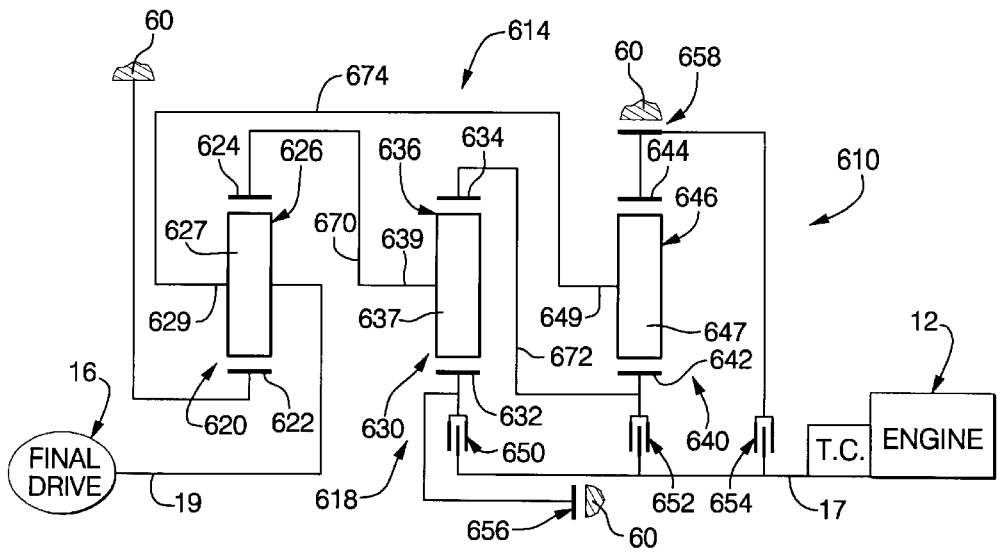
FIG. 13 is a schematic representation of a powertrain incorporating another embodiment of the present invention.
FIG. 14 is a truth table and chart depicting some of the operating characteristics of the powertrain shown in FIG. 13.

A powertrain 610, shown in FIG. 13, includes the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gearsets 620, 630, and 640, and five torque-transmitting mechanisms 650, 652, 654, 656, and 658. The torque-transmitting mechanisms 650, 652, and 654 are rotating type torque-transmitting mechanisms, and the torque-transmitting mechanisms 656 and 658 are stationary type torque-transmitting mechanisms.

The planetary gearset 620 includes a sun gear member 622, a ring gear member 624, and a planet carrier assembly member 626. The planet carrier assembly member 626 includes a plurality of pinion gears 627 rotatably mounted on a planet carrier 629 and disposed in meshing relationship with both the sun gear member 622 and the ring gear member 624.

The planetary gearset 630 includes a sun gear member 632, a ring gear member 634, and a planet carrier assembly member 636. The planet carrier assembly member 636 includes a plurality of pinion gears 637 rotatably mounted on planet carrier 639 and disposed in meshing relationship with both the sun gear member 632 and the ring gear member 634.

The planetary gearset 640 includes a sun gear member 642, a ring gear member 644, and a planet carrier assembly member 646. The planet carrier assembly member 646 includes a plurality of pinion gears 647 rotatably mounted on a planet carrier 649 and disposed in meshing relationship with both the sun gear member 642 and the ring gear member 644.

The sun gear member 622 is continuously connected with the transmission housing 60. The ring gear member 624 and planet carrier assembly member 636 are continuously interconnected by an interconnecting member 670. The ring gear member 634 and sun gear member 642 are continuously interconnected by an interconnecting member 672. The planet carrier assembly member 626, the planet carrier assembly member 646, and the output shaft 19 are continuously interconnected by an interconnecting member 674.

The input shaft 17 is selectively connectible with the sun gear member 632 through the torque-transmitting mechanism 650, selectively connectible with the interconnecting member 672 through the torque-transmitting mechanism 652, and selectively connectible with the ring gear member 644 through the torque-transmitting mechanism 654. The sun gear member 632 is selectively connectible with the transmission housing 60 through the torque-transmitting mechanism 656. The ring gear member 644 is selectively connectible with the transmission housing 60 through the torque-transmitting mechanism 644. The sun gear member 632 and ring gear member 644 are not continuously interconnected with other members of the planetary gear arrangement 618 except through the respective torque-transmitting mechanisms.

The truth table shown in FIG. 14 provides a pictorial representation of the engagement sequence and combinations for the torque-transmitting mechanisms in order to establish a reverse speed ratio and six forward speed ratios through the planetary gear arrangement 618 between the input shaft 17 and the output shaft 19. Those skilled in the art will recognize that each of single step and double step forward interchanges are of the single transition variety. The truth table also provides an example of numerical values that can be obtained in the planetary gear arrangement 618 through the judicious selection of the torque-transmitting mechanisms. These numerical values are determined utilizing the ring gear/sun gear tooth ratios of the planetary gearsets 620, 630, and 640 that are given by way of example as R1/S1, R2/S2, and R3/S3, respectively. Also provided in FIG. 14 is a chart which gives a pictorial representation of the ratio steps that are available between adjacent forward speed ratios and between the reverse and first forward speed ratio when the given numerical speed ratios are utilized.

Those skilled in the art will recognize that the reverse speed ratio has a numerical value determined by the ring gear/sun gear tooth ratios of all three planetary gearsets 620, 630, and 640. The first forward speed ratio has a numerical value determined by the ring gear/sun gear tooth ratio of the planetary gearset 640. The second forward speed ratio has a numerical value determined by the ring gear/sun gear tooth ratios of the planetary gearsets 620 and 630. The third forward speed ratio has a numerical value determined by the ring gear/sun gear tooth ratio of the planetary gearset 620. The fourth forward speed ratio is a direct drive having a numerical value of one. The fifth forward speed ratio and the sixth forward speed ratio have numerical values determined by the ring gear/sun gear tooth ratios of all three planetary gearsets 620, 630, and 640.

Figures 15, 16:
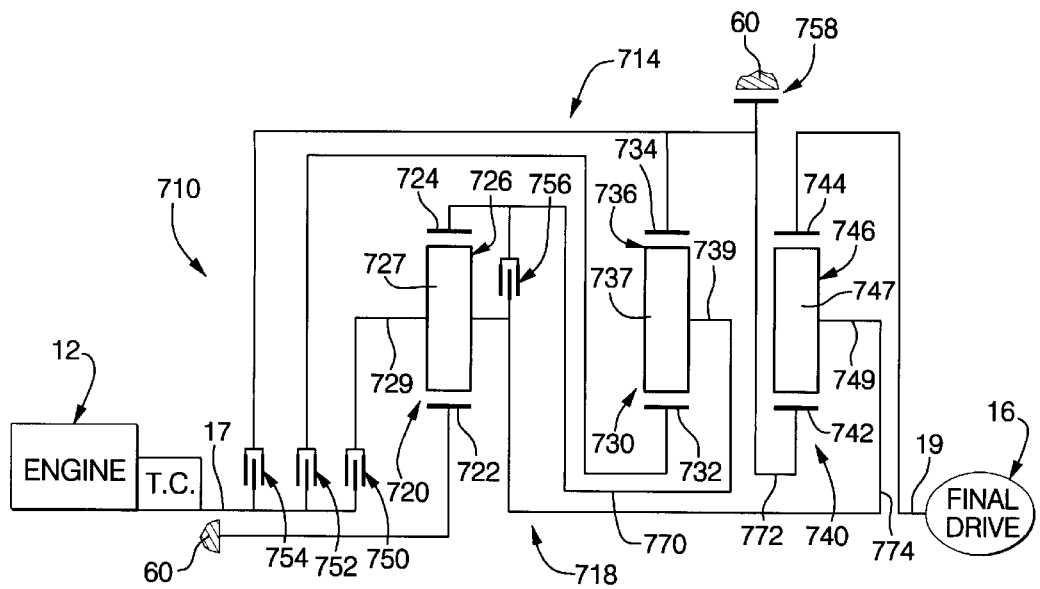
FIG. 15 is a schematic representation of a powertrain incorporating another embodiment of the present invention.
FIG. 16 is a truth table and chart depicting some of the operating characteristics of the powertrain shown in FIG. 15.

A powertrain 710, shown in FIG. 15, includes the engine and torque converter 12, a planetary transmission 714, and the final drive mechanism 16. The planetary transmission 714 includes the input shaft 17, a planetary gear arrangement 718, and the output shaft 19. The planetary gear arrangement 718 includes three planetary gearsets 720, 730, and 740, and five torque-transmitting mechanisms 750, 752, 754, 756, and 758. The torque-transmitting mechanisms 750, 752, 754, and 756 are rotating type torque-transmitting mechanisms, and the torque-transmitting mechanism 758 is a stationary type torque-transmitting mechanism.

The planetary gearset 720 includes a sun gear member 722, a ring gear member 724, and a planet carrier assembly member 726. The planet carrier assembly member 726 includes a plurality of pinion gears 727 rotatably mounted on a planet carrier 729 and disposed in meshing relationship with both the sun gear member 722 and the ring gear member 724.

The planetary gearset 730 includes a sun gear member 732, a ring gear member 734, and a planet carrier assembly member 736. The planet carrier assembly member 736 includes a plurality of pinion gears 737 rotatably mounted on planet carrier 739 and disposed in meshing relationship with both the sun gear member 732 and the ring gear member 734.

The planetary gearset 740 includes a sun gear member 742, a ring gear member 744, and a planet carrier assembly member 746. The planet carrier assembly member 746 includes a plurality of pinion gears 747 rotatably mounted on a planet carrier 749 and disposed in meshing relationship with both the sun gear member 742 and the ring gear member 744.

The output shaft 19 is continuously connected with the ring gear member 744. The sun gear member 722 is continuously connected with the transmission housing 60. The ring gear member 724 and planet carrier assembly member 736 are continuously interconnected with an interconnecting member 770. The ring gear member 734 and sun gear member 742 are continuously interconnected through an interconnecting member 772. The planet carrier assembly member 726 and planet carrier assembly member 746 are continuously interconnected by an interconnecting member 774.

The input shaft 17 is selectively connectible with the planet carrier assembly member 726 and therefore the interconnecting member 774 through the torque-transmitting mechanism 750. The input shaft 17 is selectively connectible with the sun gear member 732 through the torque-transmitting mechanism 752 and selectively connectible with the interconnecting member 772 through the torque-transmitting mechanism 754. The planet carrier assembly member 726 is selectively connectible with the interconnecting member 770 through the torque-transmitting mechanism 756. The interconnecting member 772 is selectively connectible with the transmission housing 60 through the torque-transmitting mechanism 758. The planet carrier assembly member 726 and sun gear member 732 are not continuously interconnected with other components of the planetary gear arrangement 718 except through the engagement of torque-transmitting mechanisms.

The truth table shown in FIG. 16 provides a pictorial representation of the combinations of engagements of the torque-transmitting mechanisms as well as the sequence of engagements for providing six forward speed ratios and one reverse speed ratio in the planetary gear arrangement 718 between the input shaft 17 and the output shaft 19. The truth table also provides a numerical example of the ring gear/sun gear tooth ratios that are attainable with the planetary gear arrangement 718 when the ring gear/sun gear tooth ratios of the planetary gearsets 720, 730, and 740 are as shown as R1/S1, R2/S2, and R3/S3, respectively. Also provided in FIG. 16 is a chart of the ratio steps between forward single step interchanges as well as the interchange between reverse and the first forward speed ratio. Those skilled in the art will recognize that all of the single step forward interchanges as well as the double step forward interchanges are of the single transition variety.

The reverse speed ratio has a numerical value determined by the ring gear/sun gear tooth ratio of the planetary gearset 740. The first forward speed ratio and third forward speed ratio have numerical values determined by the ring gear/sun gear tooth ratios of the planetary gearsets 720 and 740. The second forward speed ratio and fourth forward speed ratio have numerical values determined by the ring gear/sun gear tooth ratios of all three planetary gearsets 720, 730, and 740. The fifth forward speed ratio is a direct drive having a numerical value one. The sixth forward speed ratio has a numerical value determined by the ring gear/sun gear tooth ratio of the planetary gearset 740.

Figures 17, 18:
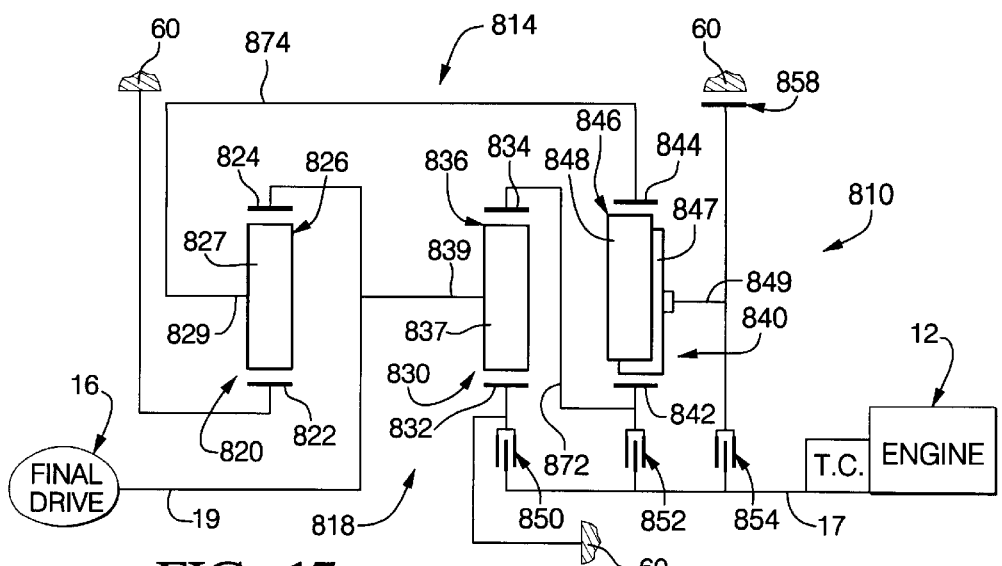
FIG. 17 is a schematic representation of a powertrain incorporating another embodiment of the present invention.
FIG. 18 is a truth table and chart depicting some of the operating characteristics of the powertrain shown in FIG. 17.

A powertrain 810, shown in FIG. 17, includes the engine and torque converter 12, a planetary transmission 814, and the final drive mechanism 16. The planetary transmission 814 includes the input shaft 17, a planetary gear arrangement 818, and the output shaft 19. The planetary gear arrangement 818 includes three planetary gearsets 820, 830, and 840, and five torque-transmitting mechanisms 850, 852, 854, 856, and 858. The torque-transmitting mechanisms 850, 852, and 854 are rotating type torque-transmitting mechanisms, and the torque-transmitting mechanisms 856 and 858 are stationary type torque-transmitting mechanisms.

The planetary gearset 820 includes a sun gear member 822, a ring gear member 824, and a planet carrier assembly member 826. The planet carrier assembly member 826 includes a plurality of pinion gears 827 rotatably mounted on a planet carrier 829 and disposed in meshing relationship with both the sun gear member 822 and the ring gear member 824.

The planetary gearset 830 includes a sun gear member 832, a ring gear member 834, and a planet carrier assembly member 836. The planet carrier assembly member 836 includes a plurality of pinion gears 837 rotatably mounted on planet carrier 839 and disposed in meshing relationship with both the sun gear member 832 and the ring gear member 834.

The planetary gearset 840 includes a sun gear member 842, a ring gear member 844, and a plurality of intermeshing pinion gears 847 and 848 rotatably mounted on a planet carrier 849 and meshing with a sun gear member 842 and a ring gear member 844, respectively. The planetary gearset 840 is therefore a double pinion or compound type planetary gearset.

The sun gear member 822 is continuously connected with the transmission housing 60. The ring gear member 824 and planet carrier assembly member 836 are continuously interconnected with an interconnecting member 870 which is also connected with the output shaft 19. The ring gear member 834 and sun gear member 842 are continuously interconnected through an interconnecting member 872. The planet carrier assembly member 826 and ring gear member 844 are continuously interconnected by an interconnecting member 874.

The input shaft 17 is selectively connectible with the sun gear member 832 through the torque-transmitting mechanism 850, selectively connectible with the interconnecting member 872 through the torque-transmitting mechanism 852, and selectively connectible with the planet carrier assembly member 846 through the torque-transmitting mechanism 854. The sun gear member 832 is selectively connectible with the transmission housing 60 through the torque-transmitting mechanism 856. The planet carrier assembly member 846 is selectively connectible with the transmission housing 60 through the torque-transmitting mechanism 858. The sun gear member 832 and planet carrier assembly member 846 are not continuously interconnected with other components of the planetary gear arrangement 818 except through the torque-transmitting mechanisms.

The truth table shown in FIG. 18 provides a pictorial representation of the engagement sequence and combinations for the torque-transmitting mechanisms in order to provide a reverse speed ratio and six forward speed ratios through the planetary gear arrangement 818 between the input shaft 17 and the output shaft 19. The truth table also provides numerical examples of the speed ratios that can be obtained with the planetary gear arrangement 818 when the ring gear/sun gear tooth ratios for the planetary gearsets 820, 830, and 840 are utilized as given in R1/S1, R2/S2, and R3/S3, respectively. Also set forth in FIG. 18 is a chart of the step ratio values between adjacent forward speed ratios and between the reverse and first forward speed ratio. It will be recognized that each of the single step forward interchanges and the double step forward interchanges are of the single transition variety.

Those skilled in the art will recognize that the reverse speed ratio has a numerical value determined by the ring gear/sun gear tooth ratios of all three planetary gearsets 820, 830, and 840. The first forward speed ratio has a numerical value determined by the ring gear/sun gear tooth ratios of the planetary gearsets 820 and 840. The second forward speed ratio has a numerical value determined by the ring gear/sun gear tooth ratio of the planetary gearset 830. The third forward speed ratio is a direct drive having a numerical value of one. The fourth forward speed ratio has a numerical value determined by the ring gear/sun gear tooth ratio of the planetary gearset 820. The fifth forward speed ratio and sixth forward speed ratio have numerical values determined by the ring gear/sun gear tooth ratios of all three planetary gearsets 820, 830, and 840.

Figures 19, 20:
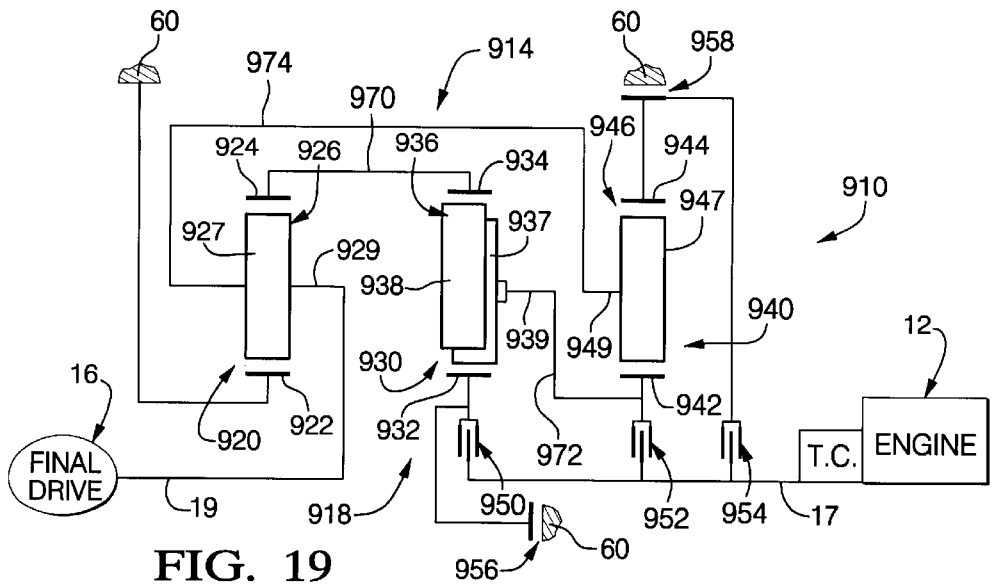
FIG. 19 is a schematic representation of a powertrain incorporating another embodiment of the present invention.
FIG. 20 is a truth table and chart depicting some of the operating characteristics of the powertrain shown in FIG. 19.

A powertrain 910, shown in FIG. 19, includes the engine and torque converter 12, a planetary transmission 914, and the final drive mechanism 16. The planetary transmission 914 includes the input shaft 17, a planetary gear arrangement 918, and the output shaft 19. The planetary gear arrangement 918 includes three planetary gearsets 920, 930, and 940, and five torque-transmitting mechanisms 950, 952, 954, 956, and 958. The torque-transmitting mechanisms 950, 952, 954 are rotating type torque-transmitting mechanisms, and the torque-transmitting mechanisms 956 and 958 are stationary type torque-transmitting mechanisms.

The planetary gearset 920 includes a sun gear member 922, a ring gear member 924, and a planet carrier assembly member 926. The planet carrier assembly member 926 includes a plurality of pinion gears 927 rotatably mounted on a planet carrier 929 and disposed in meshing relationship with both the sun gear member 922 and the ring gear member 924.

The planetary gearset 930 is a double pinion type planetary gearset having a sun gear member 932, a ring gear member 934, and a planet carrier assembly member 936. The planet carrier assembly member 936 includes a plurality of intermeshing pinion gears 937 and 938 that are rotatably mounted on a planet carrier 939 and disposed in meshing relationship with the sun gear member 932 and the ring gear member 934, respectively.

The planetary gearset 940 includes a sun gear member 942, a ring gear member 944, and a planet carrier assembly member 946. The planet carrier assembly member 946 includes a plurality of pinion gears 947 rotatably mounted on a planet carrier 949 and disposed in meshing relationship with both the sun gear member 942 and the ring gear member 944.

The sun gear member 922 is continuously connected with the transmission housing 60. The ring gear members 924 and 934 are continuously interconnected by an interconnecting member 970. The planet carrier assembly member 936 and sun gear member 942 are continuously interconnected by an interconnecting member 972. The planet carrier assembly member 926, the planet carrier assembly member 946, and the output shaft 19 are continuously interconnected by an interconnecting member 974.

The input shaft 17 is selectively connectible with the sun gear member 932 through the torque-transmitting mechanism 950, selectively connectible with the interconnecting member 972 through the torque-transmitting mechanism 952, and selectively connectible with the ring gear member 944 through the torque-transmitting mechanism 954. The sun gear member 932 is selectively connectible with the transmission housing 60 through the torque-transmitting mechanism 956, and the ring gear member 944 is selectively connectible with the transmission housing 60 through the torque-transmitting mechanism 958. The sun gear member 932 and ring gear member 944 are noncontinuously interconnected members except as provided by the selective connection through the torque-transmitting mechanisms.

The truth table of FIG. 20 describes the engagement combinations and sequence for the torque-transmitting mechanisms in order to provide a reverse speed ratio and six forward speed ratios in the planetary gear arrangement 918. The truth table also provides an example of numerical values for the speed ratios. The numerical values given are determined by the ring gear/sun gear tooth ratios of the planetary gearsets 920, 930, and 940 as represented by R1/S1, R2/S2, and R3/S3, respectively. Also provided in FIG. 20 is a numerical example of the ratio steps between adjacent forward speed ratios and between the reverse and first forward speed ratio when the given speed ratios are employed. The truth table further describes that each of the single step forward interchanges as well as the double step forward interchanges are of the single transition variety.

Those skilled in the art will recognize that the reverse speed ratio has a numerical value determined by the ring gear/sun gear tooth ratios of all three planetary gearsets 920, 930, and 940. The first forward speed ratio has a numerical value determined by the ring gear/sun gear tooth ratio of the planetary gearset 940. The second forward speed ratio has a numerical value determined by the ring gear/sun gear tooth ratios of the planetary gearsets 920 and 930. The third forward speed ratio has a numerical value determined by the ring gear/sun gear tooth ratio of the planetary gearset 920. The fourth forward speed ratio is a direct drive having a numerical value of one. The fifth and sixth forward speed ratios have numerical values determined by the ring gear/sun gear tooth ratios of all three planetary gearsets 920, 930, and 940.

Figures 21, 22:
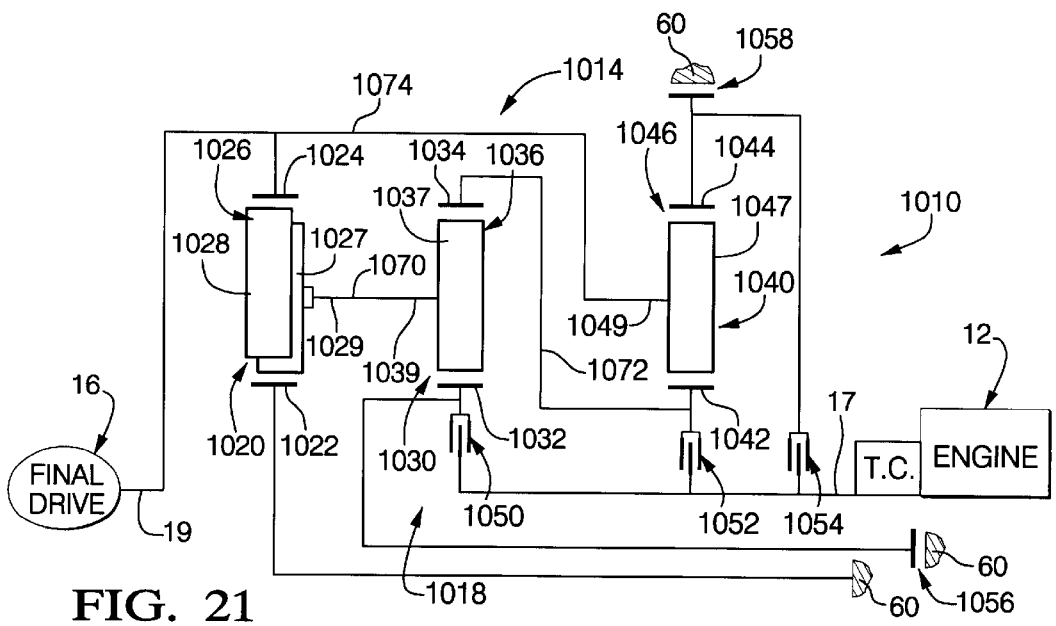
FIG. 21 is a schematic representation of a powertrain incorporating another embodiment of the present invention.
FIG. 22 is a truth table and chart depicting some of the operating characteristics of the powertrain shown in FIG. 21.

A powertrain 1010, shown in FIG. 21, includes the engine and torque converter 12, a planetary transmission 1014, and the final drive mechanism 16. The planetary transmission 1014 includes the input shaft 17, a planetary gear arrangement 1018, and the output shaft 19. The planetary gear arrangement 1018 includes three planetary gearsets 1020, 1030, and 1040, and five torque-transmitting mechanisms 1050, 1052, 1054, 1056, and 1058. The torque-transmitting mechanisms 1050, 1052, and 1054 are rotating type torque-transmitting mechanisms, and the torque-transmitting mechanisms 1056 and 1058 are stationary type torque-transmitting mechanisms.

The planetary gearset 1020 is a double pinion type planetary gearset having a sun gear member 1022, a ring gear member 1024, and a planet carrier assembly member 1026. The planet carrier assembly member 1026 has a plurality of pairs of intermeshing pinion gears 1027 and 1028 that are rotatably mounted on a planet carrier 1029 and disposed in meshing relationship with the sun gear member 1022 and the ring gear member 1024, respectively.

The planetary gearset 1030 includes a sun gear member 1032, a ring gear member 1034, and a planet carrier assembly member 1036. The planet carrier assembly member 1036 includes a plurality of pinion gears 1037 rotatably mounted on planet carrier 1039 and disposed in meshing relationship with both the sun gear member 1032 and the ring gear member 1034.

The planetary gearset 1040 includes a sun gear member 1042, a ring gear member 1044, and a planet carrier assembly member 1046. The planet carrier assembly member 1046 includes a plurality of pinion gears 1047 rotatably mounted on a planet carrier 1049 and disposed in meshing relationship with both the sun gear member 1042 and the ring gear member 1044.

The sun gear member 1022 is continuously connected with the transmission housing 60. The planet carrier assembly member 1026 and the planet carrier assembly member 1036 are continuously interconnected by an interconnecting member 1070. The ring gear member 1034 and sun gear member 1042 are continuously interconnected by an interconnecting member 1072. The ring gear member 1024, planet carrier assembly member 1046, and output shaft 19 are continuously interconnected by an interconnecting member 1074.

The input shaft 17 is selectively connectible with the sun gear member 1032 through the torque-transmitting mechanism 1050, selectively connectible with the interconnecting member 1072 through the torque-transmitting mechanism 1052, and selectively connectible with the ring gear member 1044 through the torque-transmitting mechanism 1054. The sun gear member 1032 is selectively connectible with the transmission housing 60 through the torque-transmitting mechanism 1056. The ring gear member 1044 is selectively connectible with the transmission housing 60 through the torque-transmitting mechanism 1058. The sun gear member 1032 and ring gear member 1044 are noncontinuously interconnected members except for connections provided by the torque-transmitting mechanisms related therewith.

The truth table of FIG. 22 provides a description of the engagement combinations and sequences for the torque-transmitting mechanisms in order to provide a reverse speed ratio and six forward speed ratios in the planetary gear arrangement 1018 between the input shaft 17 and the output shaft 19. The truth table also provides an example of numerical values that can be obtained with the planetary gear arrangement 1018 when the ring gear/sun gear tooth ratios of the planetary gearsets 1020, 1030, and 1040 are given in the ratios R1/S1, R2/S2, and R3/S3, respectively. Also provided in FIG. 22 is a chart depicting the ratio steps between adjacent forward speed ratios as well as between the reverse and first forward speed ratio when the given numerical values for the speed ratios are employed.

Those skilled in the art will recognize that the reverse speed ratio has a numerical value determined by the ring gear/sun gear tooth ratios of all three planetary gearsets 1020, 1030, and 1040. The first forward speed ratio has a numerical value determined by the ring gear/sun gear tooth ratio of the planetary gearset 1040. The second forward speed ratio has a numerical value determined by the ring gear/sun gear tooth ratios of the planetary gearsets 1020 and 1030. The third forward speed ratio has a numerical value determined by the ring gear/sun gear tooth ratio of the planetary gearset 1020. The fourth forward speed ratio is a direct drive having a numerical value of one. The fifth and sixth forward speed ratios have numerical values determined by the ring gear/sun gear tooth ratios of all three planetary gearsets 1020, 1030, and 1040.

Figures 23, 24:
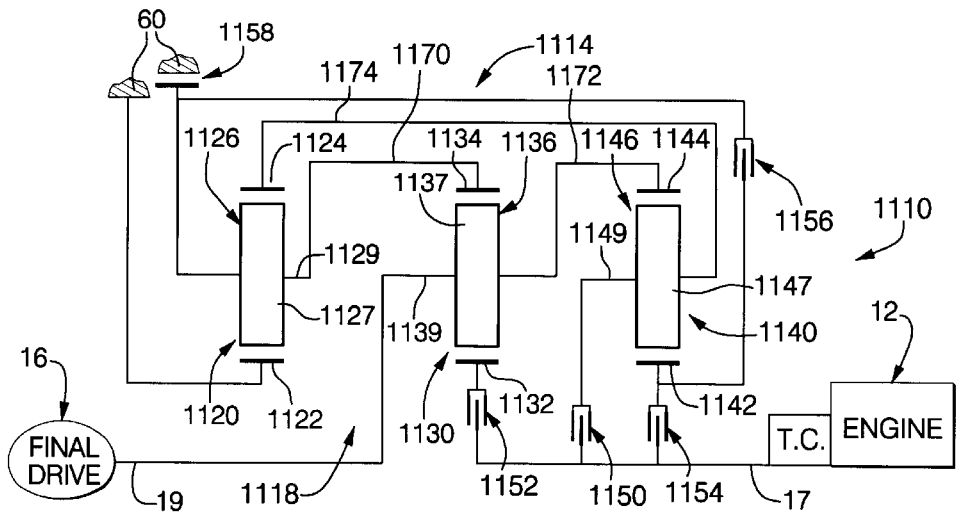
FIG. 23 is a schematic representation of a powertrain incorporating another embodiment of the present invention.
FIG. 24 is a truth table and chart depicting some of the operating characteristics of the powertrain shown in FIG. 23.

A powertrain 1110, shown in FIG. 23, includes the engine and torque converter 12, a planetary transmission 1114, and the final drive mechanism 16. The planetary transmission 1114 includes the input shaft 17, a planetary gear arrangement 1118, and the output shaft 19. The planetary gear arrangement 1118 includes three planetary gearsets 1120, 1130, and 1140, and five torque-transmitting mechanisms 1150, 1152, 1154, 1156, and 1158. The torque-transmitting mechanisms 1150, 1152, 1154 and 1156 are rotating type torque-transmitting mechanisms, and the torque-transmitting mechanisms 1158 is a stationary type torque-transmitting mechanism.

The planetary gearset 1120 is a single pinion type planetary gearset having a sun gear member 1122, a ring gear member 1124, and a planet carrier assembly member 1126. The planet carrier assembly member 1126 has a plurality of pinion gears 1127 rotatably mounted on a planet carrier 1129 and disposed in meshing relationship with both the sun gear member 1122 and the ring gear member 1124.

The planetary gearset 1130 includes a sun gear member 1132, a ring gear member 1134, and a planet carrier assembly member 1136. The planet carrier assembly member 1136 includes a plurality of pinion gears 1137 rotatably mounted on planet carrier 1139 and disposed in meshing relationship with both the sun gear member 1132 and the ring gear member 1134.

The planetary gearset 1140 includes a sun gear member 1142, a ring gear member 1144, and a planet carrier assembly member 1146. The planet carrier assembly member 1146 includes a plurality of pinion gears 1147 rotatably mounted on a planet carrier 1149 and disposed in meshing relationship with both the sun gear member 1142 and the ring gear member 1144.

The sun gear member 1122 is continuously connected with the transmission housing 60. The planet carrier assembly member 1126 and the ring gear member 1134 are continuously interconnected by an interconnecting member 1170. The planet carrier assembly 1136 and ring gear member 1144 are continuously interconnected by an interconnecting member 1172. The ring gear member 1124 and planet carrier assembly member 1146 are continuously interconnected by an interconnecting member 1174. The output shaft 19 is continuously interconnected to the planet carrier assembly 1136.

The input shaft 17 is selectively connectible with the sun gear member 1132 through the torque-transmitting mechanism 1152, selectively connectible with the interconnecting member 1174 through the torque-transmitting mechanism 1150, and selectively connectible with the sun gear member 1142 through the torque-transmitting mechanism 1154. The sun gear member 1142 is selectively connectible with the interconnecting member 1170 through the torque-transmitting mechanism 1156. The interconnecting member 1170 is selectively connectible with the transmission housing 60 through the torque-transmitting mechanism 1158. The sun gear member 1132 and sun gear member 1142 are noncontinuously interconnected members except for connections provided by the torque-transmitting mechanisms related therewith.

The truth table of FIG. 24 provides a description of the engagement combinations and sequences for the torque-transmitting mechanisms in order to provide a reverse speed ratio and seven forward speed ratios in the planetary gear arrangement 1118 between the input shaft 17 and the output shaft 19. The truth table also provides an example of numerical values that can be obtained with the planetary gear arrangement 1118 when the ring gear/sun gear tooth ratios of the planetary gearsets 1120, 1130, and 1140 are given in the ratios R1/S1, R2/S2, and R3/S3, respectively. Also provided in FIG. 24 is a chart depicting the ratio steps between adjacent forward speed ratios as well as between the reverse and first forward speed ratio when the given numerical values for the speed ratios are employed.

Those skilled in the art will recognize that the reverse speed ratio has a numerical value determined by the ring gear/sun gear tooth ratio of the planetary gearset 1140. The first forward speed ratio has a numerical value determined by the ring gear/sun gear tooth ratio of the planetary gearset 1130. The second and third forward speed ratios have numerical values determined by the ring gear/sun gear tooth ratios of all three planetary gearsets 1120, 1130 and 1140. The fourth forward speed ratio has a numerical value determined by the ring gear/sun gear tooth ratio of the planetary gearsets 1120 and 1130. The fifth forward speed ratio is a direct drive having a numerical value of one. The sixth and seventh forward speed ratios have numerical values determined by the ring gear/sun gear tooth ratios of the planetary gearsets 1120 and 1140.

Figures 25, 26:
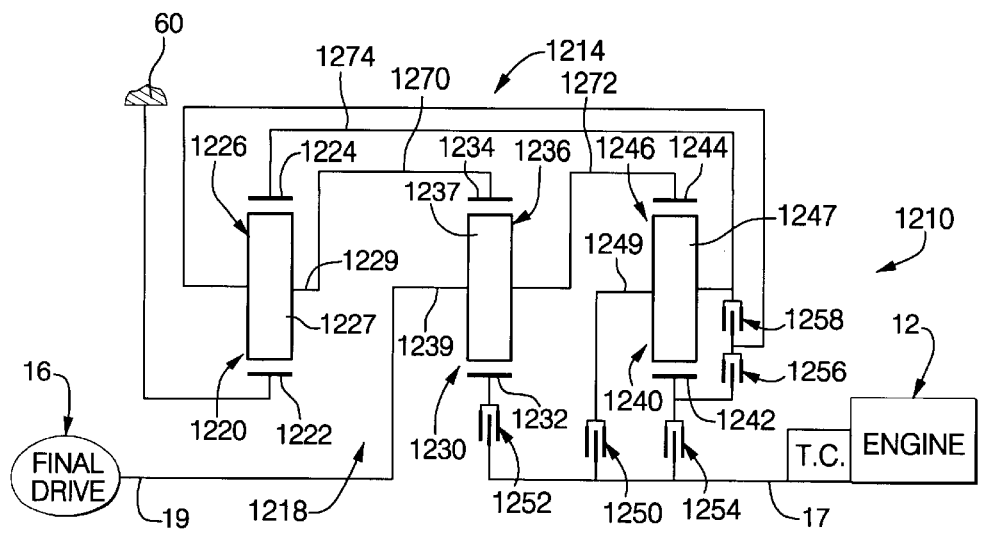
FIG. 25 is a schematic representation of a powertrain incorporating another embodiment of the present invention.
FIG. 26 is a truth table and chart depicting some of the operating characteristics of the powertrain shown in FIG. 25.

A powertrain 1210, shown in FIG. 25, includes the engine and torque converter 12, a planetary transmission 1214, and the final drive mechanism 16. The planetary transmission 1214 includes the input shaft 17, a planetary gear arrangement 1218, and the output shaft 19. The planetary gear arrangement 1218 includes three planetary gearsets 1220, 1230, and 1240, and five torque-transmitting mechanisms 1250, 1252, 1254, 1256, and 1258. The torque-transmitting mechanisms 1250, 1252, 1254, 1256 and 1258 are rotating type torque-transmitting mechanisms.

The planetary gearset 1220 is a single pinion type planetary gearset having a sun gear member 1222, a ring gear member 1224, and a planet carrier assembly member 1226. The planet carrier assembly member 1226 has a plurality of pinion gears 1227 rotatably mounted on a planet carrier 1229 and disposed in meshing relationship with both the sun gear member 1222 and the ring gear member 1224.

The planetary gearset 1230 includes a sun gear member 1232, a ring gear member 1234, and a planet carrier assembly member 1236. The planet carrier assembly member 1236 includes a plurality of pinion gears 1237 rotatably mounted on planet carrier 1239 and disposed in meshing relationship with both the sun gear member 1232 and the ring gear member 1234.

The planetary gearset 1240 includes a sun gear member 1242, a ring gear member 1244, and a planet carrier assembly member 1246. The planet carrier assembly member 1246 includes a plurality of pinion gears 1247 rotatably mounted on a planet carrier 1249 and disposed in meshing relationship with both the sun gear member 1242 and the ring gear member 1244.

The sun gear member 1222 is continuously connected with the transmission housing 60. The planet carrier assembly member 1226 and the ring gear member 1234 are continuously interconnected by an interconnecting member 1270. The planet carrier assembly 1236 and ring gear member 1244 are continuously interconnected by an interconnecting member 1272. The ring gear member 1224 and planet carrier assembly member 1246 are continuously interconnected by an interconnecting member 1274. The output shaft 19 is continuously interconnected to the planet carrier assembly 1236.

The input shaft 17 is selectively connectible with the sun gear member 1232 through the torque-transmitting mechanism 1252, selectively connectible with the interconnecting member 1274 through the torque-transmitting mechanism 1250, and selectively connectible with the sun gear member 1242 through the torque-transmitting mechanism 1254. The sun gear member 1242 is selectively connectible with the interconnecting member 1270 through the torque-transmitting mechanism 1256. The interconnecting member 1274 is selectively connectible with the interconnecting member 1270 through the torque-transmitting mechanism 1258. The sun gear member 1232 and sun gear member 1242 are noncontinuously interconnected members except for connections provided by the torque-transmitting mechanisms related therewith.

The truth table of FIG. 26 provides a description of the engagement combinations and sequences for the torque-transmitting mechanisms in order to provide a reverse speed ratio and seven forward speed ratios in the planetary gear arrangement 1218 between the input shaft 17 and the output shaft 19. The truth table also provides an example of numerical values that can be obtained with the planetary gear arrangement 1218 when the ring gear/sun gear tooth ratios of the planetary gearsets 1220, 1230, and 1240 are given in the ratios R1/S1, R2/S2, and R3/S3, respectively. Also provided in FIG. 26 is a chart depicting the ratio steps between adjacent forward speed ratios as well as between the reverse and first forward speed ratio when the given numerical values for the speed ratios are employed.

Those skilled in the art will recognize that the reverse speed ratio has a numerical value determined by the ring gear/sun gear tooth ratio of the planetary gearset 1240. The first forward speed ratio has a numerical value determined by the ring gear/sun gear tooth ratio of the planetary gearset 1230. The second and third forward speed ratios have numerical values determined by the ring gear/sun gear tooth ratios of all three planetary gearsets 1220, 1230 and 1240. The fourth forward speed ratio has a numerical value determined by the ring gear/sun gear tooth ratio of the planetary gearsets 1220 and 1230. The fifth forward speed ratio is a direct drive having a numerical value of one. The sixth and seventh forward speed ratios have numerical values determined by the ring gear/sun gear tooth ratios of the planetary gearsets 1220 and 1240.

Figures 27, 28:
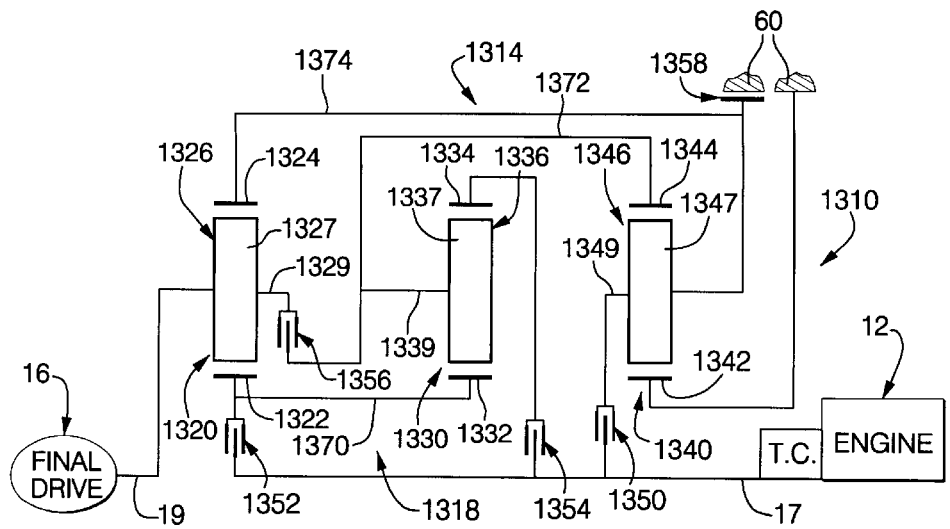
FIG. 27 is a schematic representation of a powertrain incorporating another embodiment of the present invention.
FIG. 28 is a truth table and chart depicting some of the operating characteristics of the powertrain shown in FIG. 27.

A powertrain 1310, shown in FIG. 27, includes the engine and torque converter 12, a planetary transmission 1314, and the final drive mechanism 16. The planetary transmission 1314 includes the input shaft 17, a planetary gear arrangement 1318, and the output shaft 19. The planetary gear arrangement 1318 includes three planetary gearsets 1320, 1330, and 1340, and five torque-transmitting mechanisms 1350, 1352, 1354, 1356, and 1358. The torque-transmitting mechanisms 1350, 1352, 1354 and 1356 are rotating-type torque-transmitting mechanisms. The torque-transmitting mechanism 1358 is a stationary-type torque transmitting mechanism.

The planetary gearset 1320 is a single pinion type planetary gearset having a sun gear member 1322, a ring gear member 1324, and a planet carrier assembly member 1326. The planet carrier assembly member 1326 has a plurality of pinion gears 1327 rotatably mounted on a planet carrier 1329 and disposed in meshing relationship with both the sun gear member 1322 and the ring gear member 1324.

The planetary gearset 1330 includes a sun gear member 1332, a ring gear member 1334, and a planet carrier assembly member 1336. The planet carrier assembly member 1336 includes a plurality of pinion gears 1337 rotatably mounted on planet carrier 1339 and disposed in meshing relationship with both the sun gear member 1332 and the ring gear member 1334.

The planetary gearset 1340 includes a sun gear member 1342, a ring gear member 1344, and a planet carrier assembly member 1346. The planet carrier assembly member 1346 includes a plurality of pinion gears 1347 rotatably mounted on a planet carrier 1349 and disposed in meshing relationship with both the sun gear member 1342 and the ring gear member 1344.

The sun gear member 1342 is continuously connected with the transmission housing 60. The sun gear members 1322 and 1332 are continuously interconnected by an interconnecting member 1370. The planet carrier assembly member 1336 and the ring gear member 1344 are continuously interconnected by an interconnecting member 1372. The ring gear member 1324 and planet carrier assembly member 1346 are continuously interconnected by an interconnecting member 1374. The output shaft 19 is continuously interconnected to the planet carrier assembly 1326.

The input shaft 17 is selectively connectible with the sun gear member 1322 through the torque-transmitting mechanism 1352, selectively connectible with the interconnecting member 1374 through the torque-transmitting mechanism 1350, and selectively connectible with the ring gear member 1334 through the torque-transmitting mechanism 1354. The planet carrier assembly 1326 is selectively connectible with the interconnecting member 1372 through the torque-transmitting mechanism 1356. The interconnecting member 1374 is selectively connectible with the transmission housing 60 through the torque-transmitting mechanism 1358. The ring gear member 1324 and ring gear member 1334 are noncontinuously interconnected members except for connections provided by the torque-transmitting mechanisms related therewith.

The truth table of FIG. 28 provides a description of the engagement combinations and sequences for the torque-transmitting mechanisms in order to provide a reverse speed ratio and seven forward speed ratios in the planetary gear arrangement 1318 between the input shaft 17 and the output shaft 19. The truth table also provides an example of numerical values that can be obtained with the planetary gear arrangement 1318 when the ring gear/sun gear tooth ratios of the planetary gearsets 1320, 1330, and 1340 are given in the ratios R1/S1, R2/S2, and R3/S3, respectively. Also provided in FIG. 28 is a chart depicting the ratio steps between adjacent forward speed ratios as well as between the reverse and first forward speed ratio when the given numerical values for the speed ratios are employed.

Those skilled in the art will recognize that the reverse speed ratio has a numerical value determined by the ring gear/sun gear tooth ratio of the planetary gearsets 1320 and 1330. The first forward speed ratio has a numerical value determined by the ring gear/sun gear tooth ratio of the planetary gearset 1320. The second and third forward speed ratios have numerical values determined by the ring gear/sun gear tooth ratios of the planetary gearsets 1320 and 1340. The fourth forward speed ratio is a direct drive having a numerical value of one. The fifth and seventh forward speed ratios have numerical values determined by the ring gear/sun gear tooth ratio of all three planetary gearsets 1320, 1330 and 1340. The sixth forward speed ratio has a numerical value determined by the ring gear/sun gear tooth ratios of the planetary gearset 1340.

From the above description, it will now be apparent that each of the family members has the following characteristics in common; three planetary gearsets, five torque transmitting mechanisms, and three interconnecting members. The first of the planetary gearsets has a member continuously interconnected with a member of the second planetary gearset. The second planetary gearset has a member continuously interconnected with a member of the third planetary gearset. The first planetary gearset has a member continuously interconnected with a member of the third planetary gearset. The output shaft of the transmission is continuously connected with at least one member of one of the planetary gearsets. A member of the first planetary gearset is continuously connected with a ground or transmission housing. Therefore the members of the first planetary gearset are all continuously interconnected with at least one member of the second and third planetary gearsets or the transmission housing.

The input shaft is selectively connectible with members of the planetary gearsets and/or the interconnecting members through three of the torque-transmitting mechanisms (rotating type). The other two torque-transmitting mechanisms (either stationary or rotating type) are selectively interconnectible between either the transmission housing and various members of the planetary gearsets or, when rotating type torque-transmitting mechanisms are used, between two or more of the members of the planetary gearsets. All of these family members utilize the torque-transmitting mechanisms engaged in combinations of two to establish at least six forward speed ratios and one reverse speed ratio between the input shaft and the output shaft. All of the family members have at least one member that is noncontinuously interconnected with another member of the planetary gearsets. The majority of the family members have two of the planetary members that are not continuously interconnected with any other planetary member in the planetary gear arrangements.

What is claimed is:

1. A transmission mechanism having at least six forward speeds comprising:
    an input shaft;
    an output shaft;
    a transmission housing;
    first, second, and third planetary gearsets each including first, second, and third members, said first member of said first planetary gearset being continuously interconnected with said first member of said second planetary gearset through a first interconnecting member, said second member of said first planetary gearset being continuously interconnected with said first member of said third planetary gearset through a second interconnecting member, said second member of said second planetary gearset being continuously interconnected with said second member of said third planetary gearset through a third interconnecting member, said third member of said first planetary gearset being continuously interconnected with said transmission housing, said output shaft being continuously interconnected with at least one member of one of said planetary gearsets; and
    five torque transmitting mechanisms, said torque transmitting mechanisms being selectively engaged in combinations of two to establish at least six forward speed ratios and one reverse speed ratio in said transmission mechanism.

2. The transmission defined in claim 1 further comprising:
    each of said first, second, and third members of each of said first, second, and third planetary gearsets being a member of group consisting of a sun gear member, a ring gear member, and a planet carrier assembly member; and
    each planet carrier assembly member comprising one of a single pinion assembly and a double pinion assembly.

3. The transmissions defined in claim 2 further comprising:
    each of said torque transmitting mechanisms being a member selected from a group consisting of rotating type torque transmitting mechanisms and stationary type torque transmitting mechanisms.

4. A transmission mechanism having at least six forward speeds comprising:
    an input shaft;
    an output shaft
    a transmission housing;
    a first planetary gearset having a first member, a second member, and a third member;
    a second planetary gearset having a first member, a second member, and a third member;
    a third planetary gearset having a first member, a second member, and a third member;
    said first member of said first planetary gearset being continuously interconnected with said first member of said second planetary gearset through a first interconnecting member; said second member of said first planetary gearset being continuously interconnected with said first member of said third planetary gearset through a second interconnecting member; said second member of said second planetary gearset being continuously interconnected with said second member of said third planetary gearset through a third interconnecting member; said third member of said first planetary gearset being continuously interconnected with said transmission housing; said output shaft being continuously interconnected with a member of a group consisting of one of said continuously interconnected members of said second planetary gearset, one of said continuously interconnected members of said third planetary gearset, said third member of said second planetary gearset, and said third member of said third planetary gearset; and at least one member of a group consisting of said third member of said second planetary gearset and said third member of said third planetary gearset being non-continuously interconnected with other members of said planetary gearsets; and five torque transmitting mechanisms, said torque transmitting mechanisms being selectively engaged in combinations of two to establish at least six forward speed ratios and one reverse speed ratio between said input shaft and said output shaft, wherein:

a first of said torque transmitting mechanisms selectively interconnecting said input shaft with said third member of said second planetary gearset; a second of said torque transmitting mechanisms selectively interconnecting said input shaft with said third interconnecting member, a third of said torque transmitting mechanisms selectively interconnecting said input shaft with said third member of said third planetary gearset, a fourth of said torque transmitting mechanisms selectively interconnecting said transmission housing with said third interconnecting member, and a fifth of said torque transmitting mechanisms selectively interconnecting said transmission housing with said third member of said third planetary gearset, or said first torque transmitting mechanisms selectively interconnectin said input shaft with said third member of said second planetary gearset, said second torque transmitting mechanisms selectively interconnecting said input shaft with said third interconnecting member, said third torque transmitting mechanisms selectively interconnecting said input shaft with said third member of said third planetary gearset, said fourth torque transmitting mechanisms selectively interconnecting said transmission housing with said third interconnecting member, and said fifth torque transmitting mechanisms selectively interconnecting said transmission housing with said third member of said third planetary gearset, or said first torque transmitting mechanism selectively interconnecting said input shaft with said third interconnecting member, said second torque transmitting mechanism selectively interconnecting said input shaft with said third member of said third planetary gearset, said third torque transmitting mechanism selectively interconnecting said input shaft with said first interconnecting member, said fourth torque transmitting mechanism selectively interconnecting said output shaft with said second interconnecting member, and said fifth torque transmitting mechanism selectively interconnecting said transmission housing with said second interconnecting member, or said first torque transmitting mechanism selectively interconnecting said input shaft with said first interconnecting member, said second torque transmitting mechanism selectively interconnecting said input shaft with said third interconnecting member, said third torque transmitting mechanism selectively interconnecting said input shaft with said third member of said third planetary gearset, said fourth torque transmitting mechanism selectively interconnecting said first interconnecting member with said second interconnecting member, and said fifth torque transmitting mechanism selectively interconnecting said transmission housing with said third interconnecting member, or said first torque transmitting mechanism selectively interconnecting said output shaft with said second interconnecting member, or said first torque transmitting mechanism selectively interconnecting said input shaft with said first interconnecting member, said second torque transmitting mechanism selectively interconnecting said input shaft with said third member of said second planetary gearset, said third torque transmitting mechanism selectively interconnecting said input shaft with said third interconnecting member, said fourth torque transmitting mechanism selectively interconnecting said transmission housing with said second interconnecting member, and said fifth torque transmitting mechanism selectively interconnecting said transmission housing with said third interconnecting member, or said first torque transmitting mechanism selectively interconnecting said input shaft with said third member of said second planetary gearset, said second torque transmitting mechanism selectively interconnecting said input shaft with said third interconnecting member, said third torque transmitting mechanism selectively interconnecting said input shaft with said third member of said third planetary gearset, said fourth torque transmitting mechanism selectively interconnecting said transmission housing with said third member of said second planetary gearset, and said fifth torque transmitting mechanism selectively interconnecting said transmission housing with said third member of said third planetary gearset, or said first torque transmitting mechanism selectively interconnecting said input shaft with said third member of said second planetary gearset, said second torque transmitting mechanism selectively interconnecting said input shaft with said third interconnecting member, said third torque transmitting mechanism selectively interconnecting said input shaft with said third member of said third planetary gearset, said fourth torque transmitting mechanism selectively interconnecting said transmission housing with said third member of said second planetary gearset, and said fifth torque transmitting mechanism selectively interconnecting said transmission housing with said third member of said third planetary gearset, or said first torque transmitting mechanism selectively interconnecting said input shaft with said second interconnecting member, said second torque transmitting mechanism selectively interconnecting said input shaft with said third member of said second planetary gearset, said third torque transmitting mechanism selectively interconnecting said input shaft with said third interconnecting member, said fourth torque transmitting mechanism selectively interconnecting said first interconnecting member with said second interconnecting member, and said fifth torque transmitting mechanism selectively interconnecting said transmission housing with said third interconnecting member, or said first torque transmitting mechanism selectively interconnecting said input shaft with said third member of said second planetary gearset, said second torque transmitting mechanism selectively interconnecting said input shaft with said third interconnecting member, said third torque transmitting mechanism selectively interconnecting said input shaft with said third member of said third planetary gearset, said fourth torque-transmitting mechanism selectively interconnecting said transmission housing with said third member of said second planetary gearset, and said fifth torque-transmitting mechanism selectively interconnecting said transmission housing with said third member of said third planetary gearset, or said first torque-transmitting mechanism selectively interconnecting said input shaft with said third member of said second planetary gearset, said second torque-transmitting mechanism selectively interconnecting said input shaft with said third interconnecting member, said third torque-transmitting mechanism selectively interconnecting said input shaft with said third member of said third planetary gearset, said fourth torque-transmitting mechanism selectively interconnecting said transmission housing with said third member of said second planetary gearset, and said fifth torque-transmitting mechanism selectively interconnecting said transmission housing with said third member of said third planetary gearset, or said first torque-transmitting mechanism selectively interconnecting said input shaft with said third member of said second planetary gearset, said second torque-transmitting mechanism selectively interconnecting input shaft with said third interconnecting member, said third torque-transmitting mechanism selectively interconnecting said input shaft with said third member of said third planetary gearset, said fourth torque-transmitting mechanism selectively interconnecting said transmission housing with said third member of said second planetary gearset, and said fifth torque-transmitting mechanism selectively interconnecting said transmission housing with said third member of said third planetary gearset, or said first torque-transmitting mechanism selectively interconnecting said input shaft with said second interconnecting member, said second torque-transmitting mechanism selectively interconnecting said input shaft with said third member of said second planetary gearset, said third torque-transmitting mechanism selectively interconnecting said input shaft with said third member of said third planetary gearset, said fourth torque-transmitting mechanism selectively interconnecting said third member of said third planetary gearset with said first interconnecting member, and said fifth torque-transmitting mechanism selectively interconnecting said transmission housing with said first interconnecting member, or said first torque-transmitting mechanism selectively interconnecting said input shaft with said second interconnecting member, said second torgue-transmitting mechanism selectively interconnecting said input shaft with said third member of said second planetary gearset, said third torque-transmitting mechanism selectively interconnecting said input shaft with said third member of said third planetary gearset, said fourth torque-transmitting mechanism selectively interconnecting said third member of said second planetary gearset with said first interconnecting member, and said fifth torque-transmitting mechanism selectively interconnecting said first interconnecting member with said second interconnecting member, or said first torque-transmitting mechanism selectively interconnecting said input shaft with said second interconnecting member, said second torque-transmitting mechanism selectively interconnecting said input shaft with said third member of said second planetary gearset, said third torque-transmitting mechanism selectively interconnecting said input shaft with said third interconnecting member, said fourth torque-transmitting mechanism selectively interconnecting said third member of said third planetary gearset with said first interconnecting member, and said fifth torque-transmitting mechanism selectively interconnecting said transmission housing with said second interconnecting member.

5. The transmission defined in claim 4 further comprising;
both of said third member of said second planetary gearset and said third member of said third planetary gearset being non-continuously interconnected with other members of said planetary gearsets.

6. The transmissions defined in claim 4 further comprising:
said third member of said first planetary gearset being a sun gear member.

7. The transmissions defined in claim 4 further comprising:
said first member of said first planetary gearset being a member of a first group consisting of a sun gear member, a ring gear member, and a planet carrier assembly member; said second member of said first planetary gearset being a member of said first group that is not said first member of said first planetary gearset; and said third member of said first planetary gearset being a member of said first group that is not one of said first member and said second member of said first planetary gearset;

said first member of said second planetary gearset being a member of a second group consisting of a sun gear member, a ring gear member, and a planet carrier assembly member; said second member of said second planetary gearset being a member of said second group that is not said first member of said second planetary gearset; and said third member of said first planetary gearset being a member of said second group that is not one of said first member and said second member of said second planetary gearset;

said first member of said third planetary gearset being a member of a third group consisting of a sun gear member, a ring gear member, and a planet carrier assembly member; said second member of said third planetary gearset being a member of said first group that is not said first member of said third planetary gearset; and said third member of said third planetary gearset being a member of said third group that is not one of said first member and said second member of said third planetary gearset.

8. A multi-speed transmission mechanism comprising:
an input shaft;
an output shaft;
a transmission housing;
first, second, and third planetary gearsets each including first, second, and third members, said first member of said first planetary gearset being continuously interconnected with said first member of said second planetary gearset through a first interconnecting member, said second member of said first planetary gearset being continuously interconnected with said first member of said third planetary gearset through a second interconnecting member, said second member of said second planetary gearset being continuously interconnected with said second member of said third planetary gearset through a third interconnecting member, said third member of said first planetary gearset being continuously interconnected with said transmission housing, said output shaft being continuously interconnected with at least one member of one of said planetary gearsets;

said input shaft being not continuously interconnected with any member of said planetary gear sets;

five selectively engageable torque transmitting mechanisms connecting members of said planetary gear sets with the transmission housing, input shaft, or other members of said planetary gear sets; and said torque transmitting mechanisms being selectively engaged in combinations of two to establish at least six forward speed ratios and one reverse speed ratio between said input shaft and said output shaft.

* * * * *